(12) United States Patent
Carr et al.

(10) Patent No.: US 12,409,427 B2
(45) Date of Patent: Sep. 9, 2025

(54) DIRECT ELECTRICAL HEATING OF PROCESS HEATER TUBES USING GALVANIC ISOLATION TECHNIQUES

(71) Applicants: Schneider Electric Systems USA, Inc., Foxborough, MA (US); Schneider Electric USA, Inc., Boston, MA (US)

(72) Inventors: Lanyon Carr, Gold River, CA (US); Jon A. Bickel, Murfreesboro, TN (US)

(73) Assignees: Schneider Electric Systems USA, Inc., Foxborough, MA (US); Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 19/177,018

(22) Filed: Apr. 11, 2025

(65) Prior Publication Data
US 2025/0235841 A1   Jul. 24, 2025

Related U.S. Application Data

(63) Continuation of application No. 18/477,843, filed on Sep. 29, 2023, which is a continuation-in-part of application No. 18/142,933, filed on May 3, 2023, now abandoned, which is a continuation of application No. 17/532,571, filed on Nov. 22, 2021, now Pat. No. 11,697,099.

(30) Foreign Application Priority Data

Sep. 29, 2022   (FR) ...................................... 2209906

(51) Int. Cl.
*B01J 8/06* (2006.01)
*B01J 19/00* (2006.01)
*B01J 19/24* (2006.01)
*B01J 21/04* (2006.01)
*B01J 23/755* (2006.01)

(52) U.S. Cl.
CPC ........... *B01J 8/067* (2013.01); *B01J 19/0013* (2013.01); *B01J 19/2415* (2013.01); *B01J 21/04* (2013.01); *B01J 23/755* (2013.01); *B01J 2208/00389* (2013.01); *B01J 2208/00407* (2013.01); *B01J 2208/00415* (2013.01); *B01J 2219/00132* (2013.01)

(58) Field of Classification Search
CPC ................ B01J 19/2415; B01J 19/0013; B01J 19/245; B01J 2219/00132; B01J 2219/00315; B01J 8/06; B01J 8/067; B01J 2208/00389; B01J 2208/00407; B01J 2208/00415
See application file for complete search history.

(56) References Cited

U.S. PATENT DOCUMENTS 9,908,091 B2 * 3/2018 Vogel ....................... B01J 8/062

* cited by examiner

*Primary Examiner* — Lessanework Seifu
(74) *Attorney, Agent, or Firm* — Stinson LLP

(57) ABSTRACT

The present disclosure is directed to systems and methods for direct electrical heating of process heaters tubes (e.g., reactor tubes) using galvanic isolation techniques. The disclosure is also directed to systems and methods for direct electrical heating of process heaters tubes wherein the tubes are galvanically isolated in such a manner as to avoid the use of electrical insulation of the tube from the rest of the system, such as the other tubes, the tube inlet header and/or the tube outlet header, and the reactor shell.

27 Claims, 18 Drawing Sheets

DIRECT ELECTRICAL HEATING OF PROCESS HEATER TUBES USING GALVANIC ISOLATION TECHNIQUES

REFERENCE TO RELATED APPLICATIONS

This application claims priority to French Provisional Patent Application No. 2209906 filed Sep. 29, 2022, and is a continuation of U.S. patent application Ser. No. 18/477,843 filed Sep. 29, 2023, which is continuation-in-part of U.S. patent application Ser. No. 18/142,933 filed May 3, 2023, which is a continuation of U.S. patent application Ser. No. 17/532,571 filed Nov. 22, 2021, the entire disclosures of which are incorporated herein by reference.

FIELD

Provided herein are methods and systems for direct electrical heating of catalytic reactive systems. Also provided herein are methods for conducting catalytic reactions comprising a system utilizing direct electrical heating. Still further, provided herein are systems and methods for direct electrical heating of reactor tubes using galvanic isolation techniques.

BACKGROUND

Typically, a reaction system for a catalytic reaction comprises arranging a catalyst within a reactor and directing a fluid (i.e., a liquid or gas) through the reactor where the catalytic reaction takes place. The product of the catalytic reaction is then withdrawn from the reactor and collected as a final product or directed for further processing.

Certain catalytic reactions require the presence of external heat to promote the reaction and or efficiently produce the desired product. Many systems of heating a catalytic reactor are known. For example, fired heating. Fired heating typically is comprised of either a direct fired heating system or an indirect fired heating system. In either fired heating system, the heat is typically generated by combustion of a hydrocarbon.

However, a problem exists when the heat supplied to a reactor system is provided by a fired heating system. For example, in a catalytic reaction system comprising reactor tubes, the fired heating of the reactor tube often results in uneven temperature gradients along the tube. Uneven temperature gradients along the tube can lead to premature tube failure and adversely impact throughput, catalyst life, and yield/quality of the desired product. Additionally, where multiple reactor tubes are present, there is typically a temperature differences between the tubes. Temperature differences between the reactor tubes in the same reactor system results in non-optimal throughput, and yield/quality of the desired product. Furthermore, all fired heaters are subject to typical wear and tear which will ultimately lead to deterioration in the fired heater energy efficiency. Where the fired heater comprises combustion of hydrocarbons or other materials that emit greenhouse gases such as $CO_2$, this deterioration in fired heater energy efficiency contributes to increases in greenhouse gases released from the fired heater.

One solution to this problem is to utilize direct electrical heating. However, a problem exists when the direct electrical heating system requires electrical isolation of one or more of the components. For example, where each reactor tube is required to be electrically isolated from the rest of the system, such as the other tubes, the tube inlet header, and/or the tube outlet header.

Accordingly, there remains a need in the art to develop systems and methods for direct electrical heating of process heaters tubes (e.g., reactor tubes) wherein the tubes are electrically isolated from the rest of the system, such as the other tubes, the tube inlet header, and/or the tube outlet header. There also remains a need in the art to develop systems and methods for direct electrical heating of process heaters tubes (e.g., reactor tubes) wherein the tubes are galvanically isolated in such a manner as to avoid the use of electrical insulation of the tube from the rest of the system, such as the other tubes, the tube inlet header, and/or the tube outlet header.

SUMMARY

One embodiment of the present disclosure is directed to a method of heating a reactor system wherein the reactor system comprises at least one reactor tube having a catalyst disposed therein and wherein each of the reactor tubes comprise at least one electrically conductive surface. The method comprises electrically isolating the reactor tube(s) from other electrically conductive components of the reactor system; providing electrical energy to the at least one electrically conductive surface of each of the reactor tube(s); and individually adjusting a current level of the electrical energy provided to the at least one electrically conductive surface of each of the reactor tube(s) to individually control the temperature of one or more of the reactor tube(s) and the catalyst disposed therein.

Another embodiment of the present disclosure is directed to a method of heating a reactor system comprising a plurality of reactor tubes having a catalyst disposed therein, wherein each of the plurality of reactor tubes comprise at least one electrically conductive surface. The method comprises electrically isolating each of the reactor tubes of the plurality of reactor tubes from the other electrically conductive components of the reactor system; providing electrical energy to the at least one electrically conductive surface of each of the plurality of reactor tubes; and controlling the temperature of each of the plurality of reactor tubes and the catalyst disposed therein by individually adjusting a current level of the electrical energy provided to the at least one electrically conductive surface of each reactor tube of the plurality of reactor tubes.

A reactor system embodying some aspects of the present disclosure comprises one or more reactor tubes each having a catalyst disposed therein as well as inflow and outflow pipes through which fluid enters and exits the reactor tubes. The inflow pipe(s) may be referred to herein interchangeably as an inflow pipe header or inflow pipe arrangement. The outflow pipe(s) may be referred to herein interchangeably as an outflow pipe header or outflow pipe arrangement. In various embodiments, the fluid (i.e., material to be heated in the reactor heater system) enters each reactor tube of the one or more reactor tubes via an associated inflow pipe arrangement and exits each reactor tube of the one or more reactor tubes via an associated outflow pipe arrangement.

In certain embodiments, the reactor system may also include gaskets between the one or more reactor tubes and inflow and outflow pipe arrangements to electrically isolate each reactor tube of the one or more reactor tubes from other electrically conductive components of the reactor system.

An electrical power source is configured to energize at least one electrically conductive surface on each of the reactor tubes of the one or more reactor tubes, with an adjustable current level of electrical energy to control the temperature of each reactor tube of the one or more reactor tubes and the catalyst disposed therein.

The present disclosure is further directed to an additional method of heating a reactor system. The reactor system comprises a plurality of reactor tubes, wherein each of the plurality of reactor tubes has a catalyst disposed therein and at least one electrically conductive surface. Fluid enters each reactor tube of the plurality of reactor tubes via an associated inflow pipe header and exits each reactor tube of the plurality of reactor tubes via an associated outflow pipe header. The method comprises galvanically isolating the plurality of reactor tubes such that each of the plurality of reactor tubes can be directly connected to the inflow pipe header and the outflow pipe header; providing electrical energy to the at least one electrically conductive surface of each reactor tube of the plurality of reactor tubes; and individually adjusting a current level of the electrical energy provided to the at least one electrically conductive surface of each reactor tube of the plurality of reactor tubes to individually control the temperature of each reactor tube and the catalyst disposed therein.

In another embodiment, the present disclosure is directed to any of the above reactor systems or methods of heating a reactor system, wherein electrical energy is supplied from a three-phase power source to a transformer. The first phase from the transformer is directed to a first location on the electrically conductive surface of the reactor tube. The second phase from the transformer is directed to a second location on the electrically conductive surface of the reactor tube. The third phase from the transformer is directed to a third location on the electrically conductive surface of the reactor tube. From the three-phases, multiple heating zones are produced in each reactor tube.

The present disclosure is further directed to a method of heating a reactor system including a plurality of reactor tubes, each of the plurality of reactor tubes having a catalyst disposed therein and having at least one electrically conductive surface, wherein the plurality of reactor tubes are galvanically isolated using a plurality of power controllers, the plurality of power controllers mirroring each other in order to move from zero volts at the inlet header to zero volts at the outlet header.

A further embodiment of the present disclosure is directed to a method of heating a reactor system, wherein the reactor system comprises a reactor tube having a catalyst disposed therein and at least one electrically conductive surface. The method comprises galvanically isolating the reactor tube from the other electrically conductive components of the reactor system; providing electrical energy to the at least one electrically conductive surface of the reactor tube; and individually adjusting a current level of the electrical energy provided to the at least one electrically conductive surface of the reactor tube to control the temperature of the reactor tube and the catalyst disposed therein.

An additional embodiment of the present disclosure is directed to a method of heating a reactor system comprising a controller. The method comprises executing, by a controller, a cascade control scheme; and adjusting a working setpoint of the controller in accordance with the cascade control scheme, wherein a power controller coupled to an electrical energy source is responsive to the working setpoint for adjusting a current level of the electrical energy source to heat each reactor tube of the plurality of reactor tubes to a desired reactor outlet temperature.

A still further embodiment is directed to a reactor system comprising a plurality of reactor tubes. Each of the plurality of reactor tubes has a catalyst disposed therein and at least one electrically conductive surface. Fluid enters reactor tube of the plurality of reactor tubes via an associated inflow pipe header and exits reactor tube of the plurality of reactor tubes via an associated outflow pipe header. Electrical energy is provided to the at least one electrically conductive surface of reactor tube of the plurality of reactor tubes, and the current level of the electrical energy provided to the at least one electrically conductive surface of reactor tube of the plurality of reactor tubes is adjusted to individually control the temperature of reactor tube and the catalyst disposed therein. The plurality of reactor tubes are galvanically isolated such that each of the plurality of reactor tubes can be directly connected to the inflow pipe header and the outflow pipe header.

Other objects and features will be in part apparent and in part pointed out hereinafter.

DETAILED DESCRIPTION

One embodiment of the present disclosure is directed to a method of heating a reactor system comprising a reactor (e.g., reactor tubes) having a catalyst disposed therein, wherein the reactor and the catalyst are heated by providing electrical energy to at least one electrically conductive surface on the reactor.

In another embodiment of the present disclosure, reactor tube(s) are galvanically isolated in such a manner as to avoid the necessity of electrical insulation of the reactor tube(s) from the rest of the system, such as other reactor tube(s), the inflow pipe header, and/or the outflow pipe header. Without galvanic isolation, tube(s) are generally required to be individually electrically insulated using a flange or gasket arrangement. With galvanic isolation, the flanges and gaskets are not necessary and the tubes can be directly connected (e.g., welded) to the inflow and outflow pipe headers. This has the added benefit of making the system safer with respect to potential fluid leakages, reducing maintenance costs, and reducing downtime and capital costs. This system of the present disclosure also mitigates the risks of electrical hazards to personnel.

Figure 1:
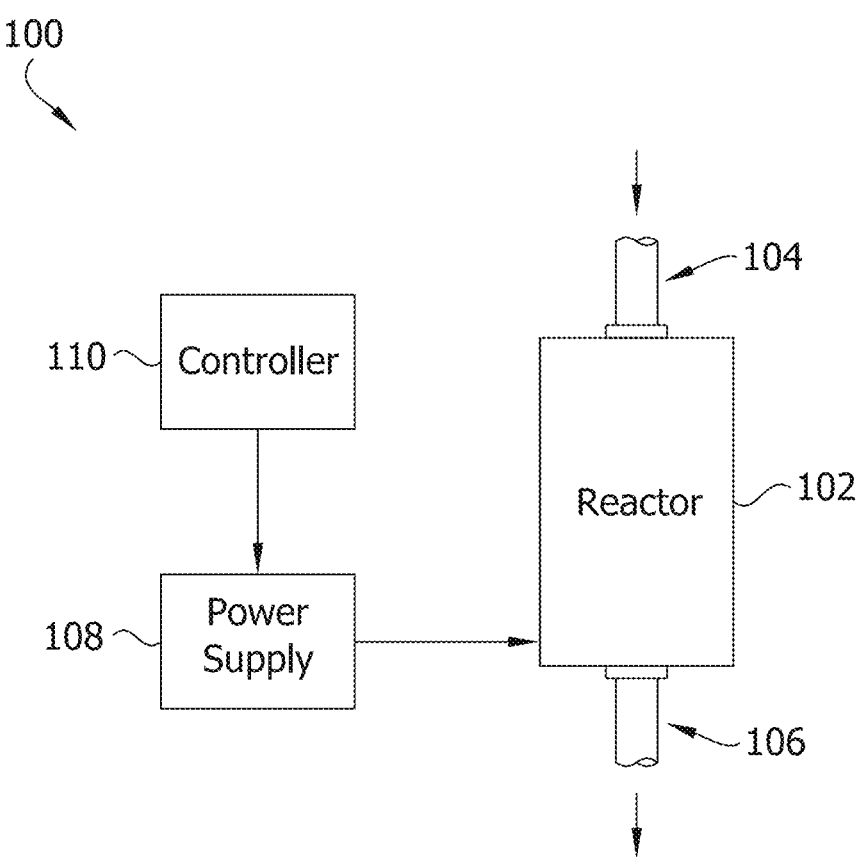
FIG. 1 is a block diagram of a reactor system according to an embodiment.

FIG. 1 illustrates a reactor system 100 embodying aspects of the present disclosure including a reactor 102 having one or more reactor tubes (not shown) through which material flows into the reactor at an inlet 104 and flows out of the reactor at an outlet 106. An electrical power supply 108 is configured to energize a conductive surface (not shown) of each reactor tube. During operation, a controller 110 adjusts a current level of electrical energy supplied to the conductive surface by the power supply 108.

Figure 2:
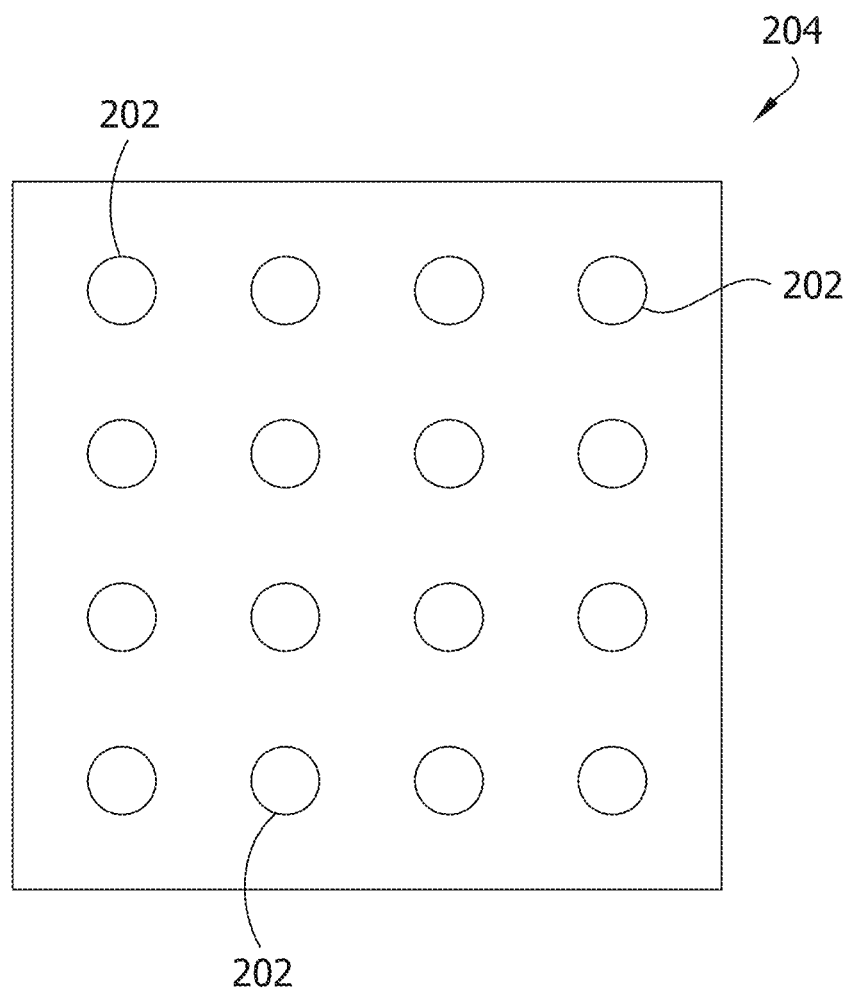
FIG. 2 provides a top-down view of the reactor system of FIG. 1 comprising a plurality of reactor tubes having a catalyst disposed therein.

FIG. 2 shows a top-down view of the reactor 102 comprising a plurality of reactor tubes 202, each having a catalyst (not shown) disposed therein. In this embodiment, the circles represent individual reactor tubes 202 contained within a thermally insulated housing 204. In addition, each of the individual reactor tubes 202 are electrically isolated from other electrically conductive elements in reactor 102 and from each other.

Figure 3:
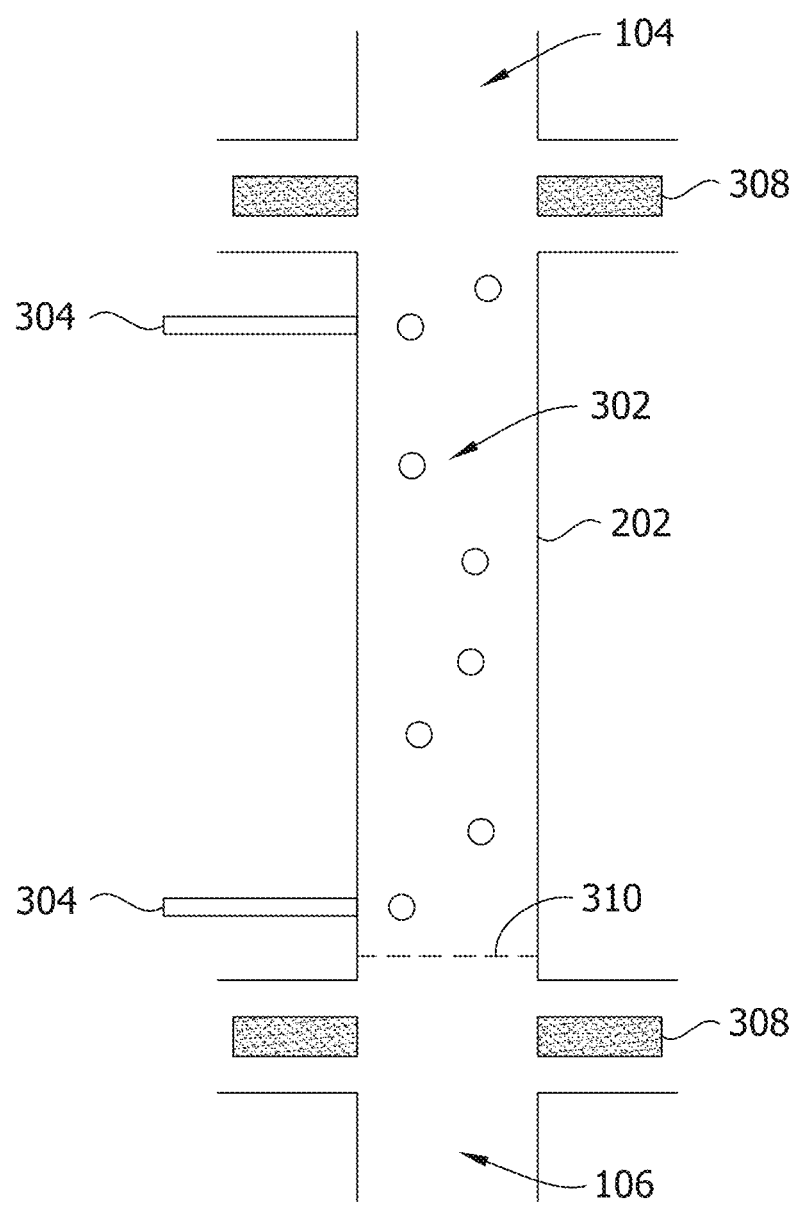
FIG. 3 provides a side view representation of an individual reactor tube of the plurality of reactor tubes present in the reactor system of FIG. 2.

FIG. 3 shows a side view of one reactor tube 202 as described above. The material to be contacted with a catalyst 302 is introduced through the top of reactor tube 202 via the inlet 104, contacts the catalyst particles present within reactor tube 202, and exits the bottom of reactor tube 202 via the outlet 106. In various embodiments, the inlet 104 is an inflow pipe header or inflow pipe arrangement and the outlet 106 is an outflow pipe header or outflow pipe arrangement. Electrical connectors 304 from the electrical power supply 108 are shown in FIG. 3 connected to the left side of reactor tube 202. The electrical connectors 304 are configured such that they are capable of supplying electrical energy from electrical power supply 108 to an electrically conductive surface (e.g., the wall of reactor tube 202 or an external conductor electrically coupled to reactor 202) present on reactor tube 202. Finally, electrical insulators 308 are shown at the top and bottom of reactor tube 202. The electrical insulators 308 are oriented such that each reactor tube 202 is electrically isolated from other electrically conductive elements in the reactor system 100, such as piping at inlet 104 and outlet 106 as well as other reactor tubes 202.

One embodiment of the present disclosure is directed to reactor system 100 comprising a plurality of reactor tubes 202 having the catalyst 302 disposed therein. The reactor tubes 202 and the catalyst 302 are heated by a method comprising providing electrical energy to at least one electrically conductive surface on each of the plurality of reactor tubes 202. It is to be understood that reactor tube 202 as referred to herein is interchangeable with embodiments described herein referencing reactor 102, when reactor 102 comprises a single reactor tube 202.

In certain embodiments of the present disclosure, the reactor 102 is electrically isolated from other electrically conductive components of the reactor system 100 and the temperature of the reactor 102 and catalyst disposed therein is controlled by adjusting the current level of the electrical energy provided to the at least one electrically conductive surface on the reactor.

For example, in one embodiment, the present disclosure is directed to reactor system 100 comprising a plurality of reactor tubes 202 having catalyst 302 disposed therein. The plurality of reactor tubes 202 and the catalyst are heated by a method comprising electrically isolating each of the plurality of reactor tubes 202 from other electrically conductive components of the reactor system 100; providing electrical energy to the at least one electrically conductive surface of each reactor tube of the plurality of reactor tubes 202; and individually adjusting a current level of the electrical energy provided to the at least one electrically conductive surface of each reactor tube of the plurality of reactor tubes to individually control the temperature of each reactor tube of the plurality of reactor tubes 202 and the catalyst 302 disposed therein.

In certain embodiments, a reaction system for a catalytic reaction comprises arranging a catalyst within a reactor and directing a fluid (i.e., a liquid or gas) through the reactor where the catalytic reaction takes place. The product of the catalytic reaction is then withdrawn from the reactor and collected as a final product or directed for further processing. In an embodiment, the reactor of the catalytic reaction may comprise a fixed or fluidized reactor. In a fixed bed reactor, the catalyst is maintained within a defined space of the reactor and the fluid flows over the catalyst and/or through the interstitial regions between the catalyst particles. In a fluidized bed reactor, the fluid is introduced into the reactor at a sufficient velocity so as to fluidize the catalyst or catalyst particles. Fluidized bed reactors may maintain the catalyst within a defined region of the reactor (e.g., between two screens) so that the catalyst is not lost during the course of the process. One example of a catalytic reaction system is a system comprising one or more reactor tubes wherein a catalyst material is disposed therein. In other embodiments, the reactor bed system may comprise a screening step to remove the catalyst from the fluid present in the reactor.

Certain catalytic reactions require the presence of external heat to promote the reaction and or efficiently produce the desired product. Previously, heat was provided to a catalytic reaction by either a direct fired heating system or an indirect fired heating system.

In a direct fired heating system, heat is supplied directed to the reactor. In an indirect fired heating system, heat is generated and transferred to an intermediate fluid. The intermediate fluid is then transported to the reactor to provide the heat. However, fired heating systems often result in uneven temperature gradients along the reactor. This non-uniform temperature along the surface of the reactor typically contributes to premature reactor failure and adversely impacts throughput, catalyst life, and yield/quality of the desired product. When the catalyst disposed within the reactor is subjected to uneven heating, the catalyst life is also greatly reduced. Additionally, fired heaters are subject to typical wear and tear which will ultimately lead to a decrease in the fired heater energy efficiency. Since most fired heaters generate heat by combustion, such as combustion of a hydrocarbon or other materials that emit greenhouse gases such as $CO_2$, this deterioration in fired heater energy efficiency contributes to an increase in greenhouse gases released and/or generated from the fired heater. In certain instances, this deterioration in efficiency may cause the efficiency to fall outside of the bounds of the design conditions.

A solution to this problem has been discovered by the methods and reaction systems of the present disclosure. In the present disclosure, the fired heating system is replaced with a direct electrical heating system. Furthermore, the direct electrical heating system uses the reactor as the heating element by providing electrical energy to an electrically conductive surface on the reactor. The current provided to the reactor can be modulated to control the temperature of the reactor and/or catalyst within the reactor and maintain a suitable temperature gradient. Thus, direct electrical heating of the reactor allows for a finer and more accurate control of the temperature of the reactor. This results in improvements in the yield/quality of the desired product, an increase in throughput, extended catalyst life, etc.

A system comprising a plurality of reactors (e.g., reactor tubes 202) may be subjected to individual electrical heating of each reactor by providing electrical energy to the electrically conductive surface of each individual reactor. This allows for a high degree of control of each reactor and a much smaller difference in the temperature between individual reactors. A more uniform distribution of temperature along a reactor wall and consistent reactor temperatures within the reaction system further benefits the process operation by creating less stress on the reactors and thus extending the reactor and catalyst life.

The ability to finely control the temperature gradient of reactor in a direct electrical heating system also allows for the possibility of dividing an individual reactor tube into two or more heating zones. This may further improve the process operations and allow for increased throughputs, yield/quality of the desired product, etc.

The problem of greenhouse gas emissions and increased pollution as a fired heater degrades can also be avoided by using an electrical heating system. Since the electrical heating system heats the reactor by providing electrical energy directly to the conductive surface of the reactor, an intermediate fluid is not needed and the energy may be provided to the reactor in a manner other than combustion of a hydrocarbon or other materials that emit greenhouse gases. Instead, the present disclosure directs electrical energy to the conductive surface of the reactor, wherein the electrical energy may originate from any renewable energy or low-emission (i.e., low carbon-emitting source) energy source. For example, the electrical energy may be sourced from a renewable energy source selected from the group consisting of a solar energy source, wind energy source, geothermal energy source, hydroelectric energy source, or tidal energy source. In one embodiment, the electrical energy originations from a nuclear power source.

Catalyst life is impacted by the poisoning of the catalyst and physical breakdown of the catalyst. Catalyst breakdown is caused primarily by expansion and contraction of the reactor, both longitudinal and radial expansion and contraction. During a catalytic reaction wherein the reactor and catalyst are heated, the reactor and/or catalyst may expand or contract. For example, in a steam methane reforming process, it is typical for a 40 ft. reactor tube to expand by about 250 mm during heating, with the catalyst expanding at a significantly lower rate. As a result of this difference in expansion rates, the catalyst settles. When the reactor tube is cooled, the catalyst may be crushed during contraction of the reactor tube.

Fired heating of a reactor results in uneven temperature gradients along the reactor. The temperature gradients can be measured along the length of the reactor and/or resulting from the comparison of one side of the reactor to the opposite side. Additional hotspot can form on the reactor as a result of flame impingement or hot gas streams associated with the flame from the direct heating. Due to this uneven heating and resulting temperature gradients, the reactor undergoes uneven expansion and contraction during the heating of the reactor. This uneven expansion and contraction may be characterized as an oscillating expansion (i.e., oscillating between expansion and contraction). The resulting physical stress on the reactor from this oscillating expansion contributes significantly to the degradation of the reactor and catalyst and ultimately shortens the useable life of the reactor and/or catalyst. Premature degradation of the reactor and/or catalyst will negatively impact the throughput, yield, and/or quality of the desired product of the catalytic reaction as well as increase the maintenance and operation costs of the catalytic reaction.

In contrast, by using a direct electrical heating system of the present disclosure, it is possible to control the temperature along the reactor to ensure a more even temperature gradient both longitudinal and radially. While heating of the reactor by an electrical heating system may lead to expansion and contraction, the expansion and contraction is not of an oscillating nature. For example, the reactor may expand once during uniform heating and contract once during uniform decrease in the electrical energy provided to heat the reactor. Thus, the usable life of the reactor can be greatly improved by limiting the cycles of expansion and contraction that the reactor experiences. Likewise, the ability of a direct electrical heating system to more uniformly heat the reactor results in a more uniform heating of the catalyst present within the reactor. By limiting the temperature oscillation that the catalyst is subjected to, the physical integrity and usable life of the catalyst is significantly increased. While there may still be temperature variation due to changes in throughput or feed composition, such variations will not significantly contribute to degradation of the reactor/catalyst as compared to traditional fired heating reactor system.

For example, in one embodiment of the present disclosure, the difference in temperature between two points on the surface of the one or more reactors (e.g., reactor tube(s)) is about 50° C. or less, about 40° C. or less, about 30° C. or less, about 20° C. or less, about 10° C. or less, about 5° C. or less, about 4° C. or less, about 3° C. or less, about 2° C. or less, or about 1° C. or less. In another embodiment, the difference in temperature between two points on the surface of the one or more reactors (e.g., reactor tube(s)) is from about 50° C. to about 0.5° C., from about 40° C. to about 0.5° C., from about 40° C. to about 1° C., from about 30° C. to about 1° C., from about 20° C. to about 1° C., from about 10° C. to about 1° C., from about 5° C. to about 1° C., from about 4° C. to about 1° C., from about 3° C. to about 1° C., or from about 2° C. to about 1° C.

In an embodiment of the present disclosure comprising a plurality of reactors (e.g., reactor tube(s)), the temperature difference between the hottest reactor of the plurality of reactors and the coolest reactor of the plurality of reactors may be about 50° C. or less, about 40° C. or less, about 30° C. or less, about 20° C. or less, about 10° C. or less, about 5° C. or less, about 4° C. or less, about 3° C. or less, about 2° C. or less, or about 1° C. or less. For example, in some embodiment, the temperature difference between the hottest reactor of the plurality of reactors and the coolest reactor of the plurality of reactors may be from about 50° C. to about 0.5° C., from about 40° C. to about 0.5° C., from about 40° C. to about 1° C., from about 30° C. to about 1° C., from about 20° C. to about 1° C., from about 10° C. to about 1° C., from about 5° C. to about 1° C., from about 4° C. to about 1° C., from about 3° C. to about 1° C., or from about 2° C. to about 1° C.

In addition to improving the usable life of the reactor and catalyst and demonstrating an improved throughput, yield, and/or quality of the desired product as compared to a fired heating system, the methods of the present disclosure comprising a direct electrical heating system also allows for greatly improved control of the reactor system.

As explained above, a fired heating system typically comprises combustion of a hydrocarbon or transfer of the heat energy to the reactor via an intermediate fluid (i.e., a heat transfer fluid). In a fired heating system, the amount that the reactor is heated is controlled based upon the desired temperature of the reactor fluid at the exit of the reactor. There is significant delay in adjusting the temperature of the reactor because the firing rate of the combustion must be adjusted and the intermediate fluid temperature increased such that the intermediate fluid transfers the heat to the reactor and contents thereof. In this configuration, the heat transfer from the intermediate fluid is a convective heat transfer, which is typically a slower heat transfer as compared to, for example, radiant heat transfer. In this way, there may be lag time between the control input into a fired heating system and the actual change in the temperature of the reactor fluid at the exit of the reactor.

In contrast, the electrical heating system of the present disclosure comprises providing electrical energy directly to the conductive surface on the reactor. For example, in one embodiment, the reactor system comprises a plurality of reactor tubes having catalyst disposed therein and at least one electrically conductive surface on each of the plurality of reactor tubes, wherein electrical energy is provided to the at least one electrically conductive surface on each of the plurality of reactor tubes. The electrical heating system of the present disclosure controls the heat of the reactor system 100 by energy control (i.e., modulating the electrical energy provided to the at least one electrically conductive surface on each of the plurality of reactor tubes). Therefore, the electrical heating system of the present disclosure allows for a swift change in the reaction temperature by adjusting the electrical energy input to each reactor tube. This allows for more precise control of the reactor system, as well as the ability to more accurately maintain the temperature of each individual reactor tube and reduce the maximum temperature difference between reactor tubes in the reactor. The electrical heating system of the present disclosure also allows for reduction in the uneven distribution of temperature within an individual tube typically observed in traditional processes, i.e., the creation of hot spots due to flame impingement on the tube or other factors that leads to the maldistribution of the heat from the combustion process.

The electrical heating system of the present disclosure also allows for a correlation to be made between the inputs of the electrical energy and the catalytic reaction product. In this way, the amount of energy input to the reactor system can be controlled such that no more electrical energy is introduced into the system than is required for the reaction to proceed to the desired yield or purity. In certain embodiments, it may be desirable to control the electrical energy input such that a slight excess of electrical energy is provided to the reactor system 100.

The control realized by an electrical heating system may provide exceptional improvements over a fired heating system. For example, a reactor system comprising an indirect fired heating system may require 20 minutes or longer between adjustment of the temperature profile in the heater and the desired change in the reactor system. However, a reactor system comprising an electrical heating system may require less than 1 minute between adjustment of the energy input to the reactor and the desired change in the reactor system. This not only provides improved the safety of the reactor system but allowed for a more efficient process as compared to systems comprising a fired heater.

The electrical energy provided to the at least one electrically conductive surface of the reactor or plurality of reactors may be from a plurality of electrical energy sources. In certain embodiments, at least a portion of the electrical energy is provided by a renewable energy source or low carbon-emitting source. For example, the energy may be provided from a nuclear power source. In other embodiments, the electrical energy is provided solely by a renewable energy source. The renewable energy source may be, for example, selected from the group consisting of a solar energy source, wind energy source, geothermal energy source, hydroelectric energy source, or tidal energy source.

The reactor used in the reactor system of the present disclosure may be any suitable reactor. For example, the reactor may be a fixed or fluidized reactor. In certain embodiments, the reactor of the direct electrical heating system of the present disclosure comprises a plurality of reactor tubes. For example, a plurality of fixed bed reactor tubes. Although reference is made herein to an embodiment comprising a plurality of reactor tubes, it will be understood that the reactor system and methods of the present disclosure are equally applicable to systems comprising other types of reactors.

The reactor(s) are designed or selected such that each reactor has at least one electrically conductive surface for the application of electrical energy. In certain embodiments, each of the plurality of reactor(s) comprise an electrically conductive material such that at least one surface of the reactor is electrically conductive. For example, in some embodiments, the materials of construction of the reactor(s) comprise an electrically conductive material such that at least one surface of the reactor is electrically conductive. In another embodiment, the reactor(s) comprise an electrically conductive material affixed to one or more surface of the reactor.

The electrically conductive material may comprise an electrically conductive metal or alloy. For example, the metal or alloy may be selected from the group consisting of gold, silver, copper, aluminum, nickel, tin, brass, iron, platinum, palladium, molybdenum, tungsten, chromium, niobium, chromium, alloys thereof, and combinations thereof. In certain embodiments, the metal or alloy is selected from the group consisting of gold silver, copper, nickel, tin, chromium, niobium, alloys thereof, and combinations thereof. In still further embodiments, the metal or alloy is selected from the group consisting of nickel, chromium, niobium, alloys thereof, and combinations thereof. In certain embodiments, the metal or alloy is a nickel alloy wherein the alloy further comprises chromium, iron, molybdenum, and/or copper. In still further embodiments, the electrically conductive material may comprise an electrically conductive ceramic.

In various embodiments, the reactor(s) (e.g., reactor tube(s)) may comprise carbon steel or carbon steel alloys, stainless steel or stainless steel alloys, nickel or nickel alloys, or combinations thereof. For example, the reactor(s) (e.g., reactor tube(s)) may comprises a material selected from ASTM A192, ASTM A210 Gr A-1, ASTM A209 Gr T1, ASTM A213 Gr T11, ASTM A213 Gr T22, ASTM A213 Gr T21, ASTM A213 Gr T5, ASTM A213 Gr T5b, ASTM A213 Gr T9, ASTM A213 T91, ASTM 213 ASTM TP 304, ASTM A213 TP 304H, ASTM A213 TP 304L, ASTM A213 TP 316, ASTM A213 TP 316H, ASTM A213 TP 316L, ASTM A213 TP 317, ASTM A213 TP 317L, ASTM A213 TP 321, ASTM A213 TP 321H, ASTM A213 TP 347, ASTM A213 TP 347H, ASTM B407, ASTM A213 TP 310H, or combinations thereof. In certain embodiments, the above-noted materials may form at least a portion of the electrically conductive metal or alloy of the electrically conductive material/surface.

In one embodiment, the one or more reactor(s) comprise an electrically conductive metal or alloy such that at least one surface of each reactor is electrically conductive. Each rector tube may comprise, for example, about 25 wt. % or greater, about 30 wt. % or greater, about 35 wt. % or greater, about 40 wt. % or greater, about 45 wt. % or greater, about 50 wt. % or greater, about 55 wt. % or greater, about 60 wt. % or greater, about 65 wt. % or greater, about 70 wt. % or greater, or about 75 wt. % or greater of total electrically conductive metal or alloy. In certain embodiments each rector comprises from about 25 wt. % to about 75 wt. %, from about 30 wt. % to about 70 wt. %, from about 35 wt. % to about 70 wt. %, from about 40 wt. % to about 70 wt. %, from about 45 wt. % to about 70 wt. %, from about 50 wt. % to about 70 wt. %, from about 55 wt. % to about 65 wt. %, or from about 60 wt. % to about 65 wt. % of total electrically conductive metal or alloy.

In one embodiment, each reactor comprises from about 5 wt. % to about 40 wt. %, from about 10 wt. % to about 35 wt. %, from about 15 wt. % to about 30 wt. %, or from about 20 wt. % to about 30 wt. % of chromium.

In some embodiments, each reactor comprises from about 5 wt. % to about 50 wt. %, from about 10 wt. % to about 45 wt. %, from about 15 wt. % to about 40 wt. %, from about 20 wt. % to about 40 wt. %, from about 25 wt. % to about 40 wt. %, or from about 30 wt. % to about 40 wt. % of nickel.

In certain embodiments, each reactor comprises from about 0.5 wt. % to about 5 wt. %, from about 0.5 wt. % to about 4 wt. %, from about 0.5 wt. % to about 3 wt. %, from about 0.5 wt. % to about 2 wt. %, or from about 1 wt. % to about 2 wt. % of niobium.

In other embodiments, each reactor comprises from about 0.5 wt. % to about 5 wt. %, from about 0.5 wt. % to about 4 wt. %, from about 0.5 wt. % to about 3 wt. %, from about 0.5 wt. % to about 2 wt. %, or from about 1 wt. % to about 2 wt. % of molybdenum.

In still further embodiments, each reactor comprises a nickel alloy wherein the alloy further comprises chromium, iron, molybdenum, and/or copper and wherein the reactor comprises from about 0.5 wt. % to about 5 wt. %, from about 0.5 wt. % to about 4 wt. %, from about 0.5 wt. % to about 3 wt. %, from about 0.5 wt. % to about 2 wt. %, or from about 1 wt. % to about 2 wt. % of the nickel alloy.

In one embodiment of the present disclosure, each of the reactors 102 of the reactor system 100 and methods of the present disclosure are insulated and/or isolated to ensure that the electrical energy provided to the at least one electrically conductive surface of the reactor does not freely flow to other parts of the reactor system. In one embodiment comprising a plurality of reactors, each of the plurality of reactors are electrically isolated from the other electrically conductive components of the reactor system. For example, in certain embodiments, each of the plurality of reactors may be electrically isolated from one another and the other electrically conductive process equipment present in the process.

In some embodiments, the reactor(s) 102 may be electrically isolated, for example, by refractory materials. In certain embodiments, the reactor(s) 102 may be electrically isolated by a material selected from the group consisting of ceramics, nylon, polystyrene, polyvinylchloride (PVC), silicon, rubber, glass, and combinations thereof.

In one embodiment, an electrical insulator is placed at the physical connection point between the one or more reactors. In another embodiment, the reactor system 100 comprises a plurality of reactors 102 and electrical insulators are positions such that no single reactor is in contact with another reactor. In still further embodiments, the reactor system 100 comprises a plurality of reactors 102 and the plurality of reactors are electrically insulated from the remainder of the process equipment. FIG. 2, explained in further detail below, illustrates a reactor system comprising 16 reactor tubes arranged such that each reactor tube is electrically insulated and the entire reactor system is surrounded by an insulating wall material.

The material that may be used to electrically insulate and/or isolate each of the reactors of the reactor system may be any suitable insulating/isolating material. For example, the insulating/isolating material may be selected from the group consisting of ceramics, nylon, polystyrene, polyvinylchloride (PVC), silicon, rubber, glass, and combinations thereof. In certain embodiments, the insulating/isolating material may be selected from the group consisting of refractory materials, ceramics, and glass. In some embodiments, the insulating/isolating material may be a ceramic selected from the group consisting of ceramic fiber, a ceramic blanket, a ceramic board, or combinations thereof. In other embodiments, the insulating/isolating material may be selected from the group consisting of concrete (e.g., castable insulating concrete), a fiber brick, mineral wool, or combinations thereof.

It will be understood that the particular catalyst used in the reactor system and methods of the present disclosure will depend on the catalytic reaction that is being conducted. An exemplary embodiment of steam methane reforming is described herein. However, the scope of the disclosure and application of the reactor system is not limited to a steam methane reforming process.

In a method comprising a steam methane reforming process, the catalyst may be a catalyst comprising nickel. The catalyst may be prepared by depositing nickel on a carrier. For example, the nickel may be deposited on an oxide substrate selected from the group consisting of $Al_2O_3$, $CeO_2$, $La_2O_3$, MgO, $SiO_2$, $ZrO_2$, calcium aluminates, and combinations thereof. In one embodiment, nickel is deposited on an alumina ceramic substrate (e.g., $Al_2O_3$).

In other embodiments methane reforming process, the catalyst may comprise Ru and/or Rh on a carrier. For example, the Ru and/or Rh may be deposited on an oxide substrate selected from the group consisting of $Al_2O_3$, $CeO_2$, $La_2O_3$, MgO, $SiO_2$, $ZrO_2$, calcium aluminates, and combinations thereof.

In one embodiment, the catalyst comprises about 10 wt. % or greater, about 15 wt. % or greater, about 20 wt. % or greater, about 25 wt. % or greater, about 30 wt. % or greater, about 35 wt. % or greater, about 40 wt. % or greater, or about 45 wt. % or greater of nickel based on the total weight of the catalyst. In another embodiment, the catalyst comprises from about 10 wt. % to about 50 wt. %, from about 15 wt. % to about 50 wt. %, from about 15 wt. % to about 40 wt. %, from about 20 wt. % to about 40 wt. %, from about 20 wt. % to about 35 wt. %, or from about 20 wt. % to about 30 wt. % of nickel based on the total weight of the catalyst. In another embodiment, the catalyst comprises from about 10 wt. % to about 50 wt. %, from about 15 wt. % to about 50 wt. %, from about 20 wt. % to about 50 wt. %, from about 25 wt. % to about 50 wt. %, or from about 30 wt. % to about 50 wt. % of nickel based on the total weight of the catalyst.

The catalyst may be in any commercially suitable shape. For example, the catalyst may be in the shape of a ring, sphere, tablet, pellet, or particle. In one embodiment, the catalyst is in the form of a ring. In other embodiments, the catalyst may be a complex shape to increase the voidage and geometric surface area (e.g., MAGCAT TEXTURED catalyst, commercially available from Magma Catalyst).

In certain embodiments, the catalyst has an average diameter of about 2 inches or less, about 1.5 inches or less, about 1.25 inches or less, about 1 inch or less, about 0.75 inches or less, about 0.5 inches or less, or about 0.25 inches or less. In one embodiment, the catalyst has an average diameter of from about 2 inches to about 0.25 inches, from about 1.75 inches to about 0.25 inches, from about 1.5 inches to about 0.25 inches, from about 1.5 inches to about 0.5 inches, from about 1.25 inches to about 0.5 inches, or from about 1 inch to about 0.5 inches.

FIG. 2 is a drawing of the top-down view of one embodiment of reactor 102 comprising the plurality of reactor tubes 202 having catalyst 302 disposed therein. The circles represent individual reactor tubes 202 of the reactor 102 that are insulated such that each of the individual reactor tubes 202 are electrically isolated from the other electrically conductive elements in the reactor 102. Additionally, each of the each of the individual reactor tubes 202 are electrically isolated from the other reactor tubes 202 of the reactor 102.

FIG. 3 shows a side view representation of reactor tube 202 as described above. The material to be contacted with the catalyst 302 is introduced through the top of the reactor tube 202, contacts the catalyst 302 present within the reactor tube 202, and exits the bottom of the reactor tube 202. The catalyst 302 may be maintained in the reactor tube 202 through use of one or more catalyst support plates and/or screens 310. FIG. 3 demonstrates reactor tube 202 utilizing a bottom catalyst support plate 310. The one or more catalyst support plates and/or screens 310 may be selected such that the material (e.g., a liquid or gas) contacted with the catalyst 302 may flow through the respective plates and/or screens but that the catalyst particles cannot flow out of the reactor tube 202. However, it will be well understood that in practice it may not be possible to prohibit all of the catalyst particles from flowing out of the reactor tube 202. Therefore, a support plate and/or screen 310 should be selected during the design of the reactor tube 202 to minimize loss of catalyst particles, taking into consideration the commercial considerations of the subject reaction and the properties of the catalyst 302. Electrical connectors 304 are shown in FIG. 3 connected to the left side of the reactor tube 202. As described above, these electrical connectors 304 are oriented such that they are capable of supplying electrical energy from electrical energy source 108 to the electrically conductive surface present on the reactor tube 202. Finally, electrical insulators 308 are shown at the top and bottom of the reactor tube. These electrical insulators 308 are oriented such that each reactor tube 202 is electrically isolated from the other reactor tubes 202 as well as the other electrically conductive elements in the reactor system 100.

Figure 4:
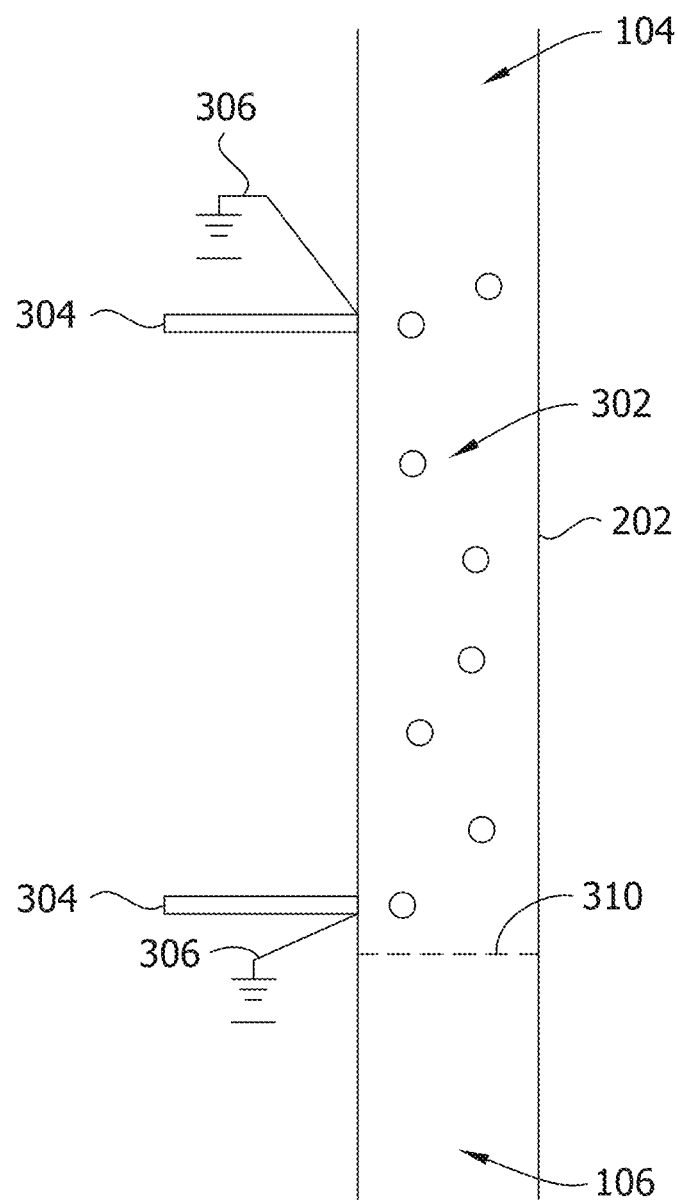
FIG. 4 provides a side view representation of an individual reactor tube of the plurality of reactor tubes present in the reactor system of FIG. 2 wherein the tube comprises electrical grounding points instead of electrical isolators.

FIG. 4 shows a side view representation of another embodiments of reactor tube 202 as described above. The reactor tube of FIG. 4 is similar to that of FIG. 3, except that FIG. 4 utilizes grounding points 306 in place of the electrical insulators. Electrical grounding points may be desirable as a method for electrically isolating the individual reactor tube without the need for physical insulation. In certain configurations, the exterior of the reactor tube may reach temperatures that exceed operating ranges of common insulators. Electrical isolation by a grounding point 306 allows for the isolation of the reactor tube without the requirement of using insulators specifically designed for extreme temperatures. This may result in considerable cost savings.

Figure 5:
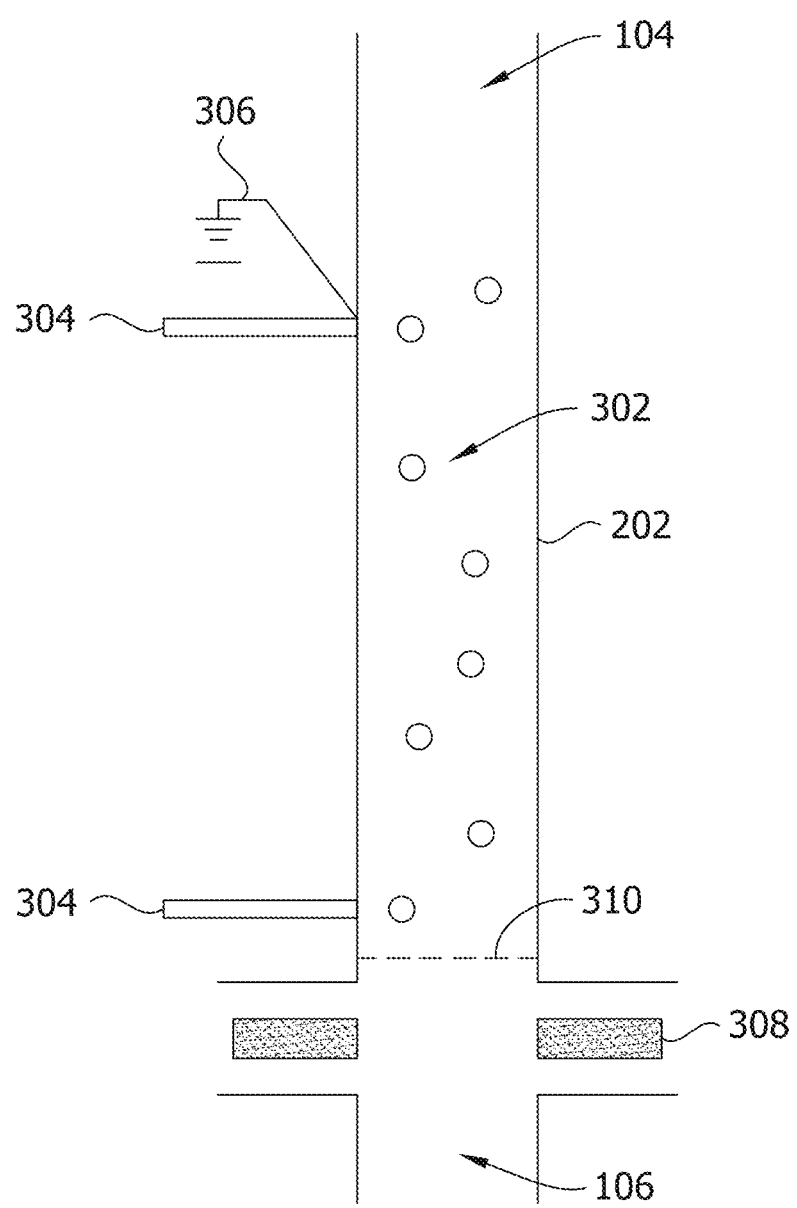
FIG. 5 provides a side view representation of an individual reactor tube of the plurality of reactor tubes present in the reactor system of FIG. 2 wherein the tube comprises an electrical grounding point in place of top electrical insulators.

FIG. 5 shows a side view representation of a still further embodiment of reactor tube 202 as described above. The reactor tube of FIG. 5 is similar to that of FIG. 3, except that FIG. 5 utilizes a single grounding point 306 in place of the electrical insulator at the top of the reactor tube. Replacing the physical electrical insulator with a grounding point may have the advantages described above. In a reactor tube such as FIG. 5, where the material flows from the bottom to the top, the internal temperature of the reactor tube typically increases as the material flows towards the top. This is due to the material within the tube being heated as it passes through the reactor tube. By replacing only the top insulator with an electrical grounding point, the hotter end of the reactor tube is electrically isolated without the need for physical insulators specifically designed for extreme temperatures.

Figure 6:
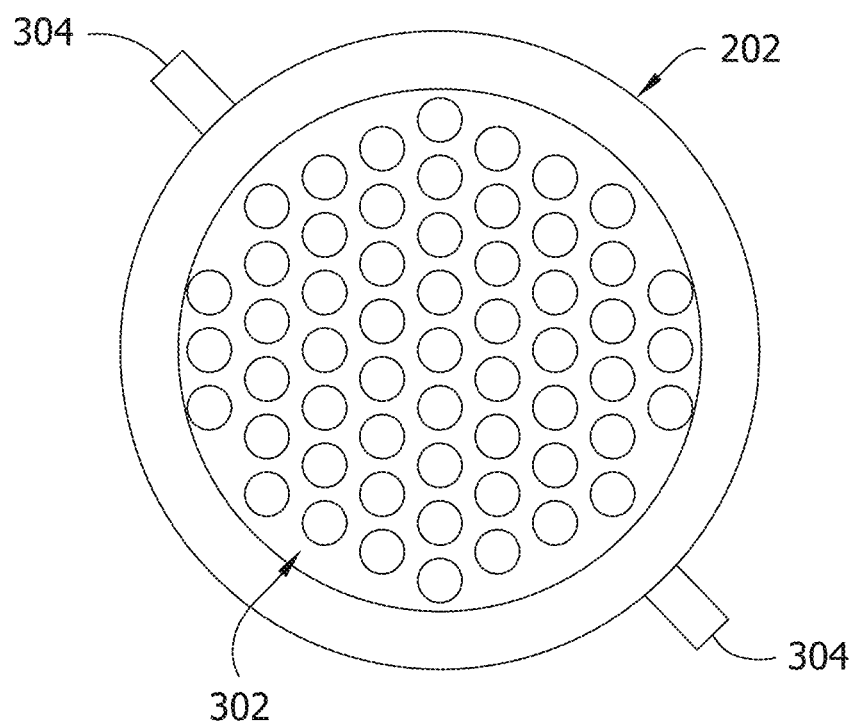
FIG. 6 provides a top-down view of an individual reactor tube.

FIG. 6 provides a detailed drawing of one embodiment of an individual reactor tube 202. The orientation of the drawing is a top-down view of the reactor tube. The large circle represents the wall of the reactor tube. The reactor tube wall comprises at least one electrically conductive surface such that electrically energy can be provided to the electrically conductive surface to heat the reactor tube and its contents.

The particles within the large circle represent particles of catalyst 302 disposed within the reactor tube 202. Although the catalyst particles are shown as uniformly dispersed and comprising the majority of the area within the reactor tube 202, one skilled in the art would understand that the amount and orientation of the catalyst particles within the reactor tube 202 will depend upon the intended application. For example, in some reactions, the process may require a high flow rate of material. In this situation, the catalyst 302 should be packed in the reactor tube 202 at a low enough density such that the system 100 can achieve such a high flow rate and maintain the overall reaction rate desired by the process. In other reactions, it may be necessary to prolong the amount of time that the material is in physical contact with the catalyst. In that situation, it may be desirable to pack the reactor tube 202 with catalyst 302 at a higher density to increase the residence time within the reactor tube 202 and thereby increase the amount of time that the material is in physical contact with the catalyst. It will be understood that these design choices with respect to catalyst packing in the reactor tube may be made based upon the reaction's conditions, catalyst composition, physical properties of the catalyst particles (i.e., particle size), and/or desired end product. That is, the catalyst may be packed in the reactor in a uniform or random orientation.

Two electrical connectors 304 are shown in FIG. 6 connected to the reactor tube wall. The electrical connectors 304 are in contact with the reactor tube wall comprising at least one electrically conductive surface. In this way, electrical energy can be supplied from electrical energy source 108 to the electrically conductive surface of each individual reactor tube 202. When electrical energy is applied to the electrically conductive surface, the reactor tube 202 heats the catalyst and reactor fluid disposed therein. The temperature of the reactor tube 202 and catalyst 302 can be finely controlled by regulating the amount of electrical energy applied to the electrical connectors 304 of each reactor tube 202.

Figure 7:
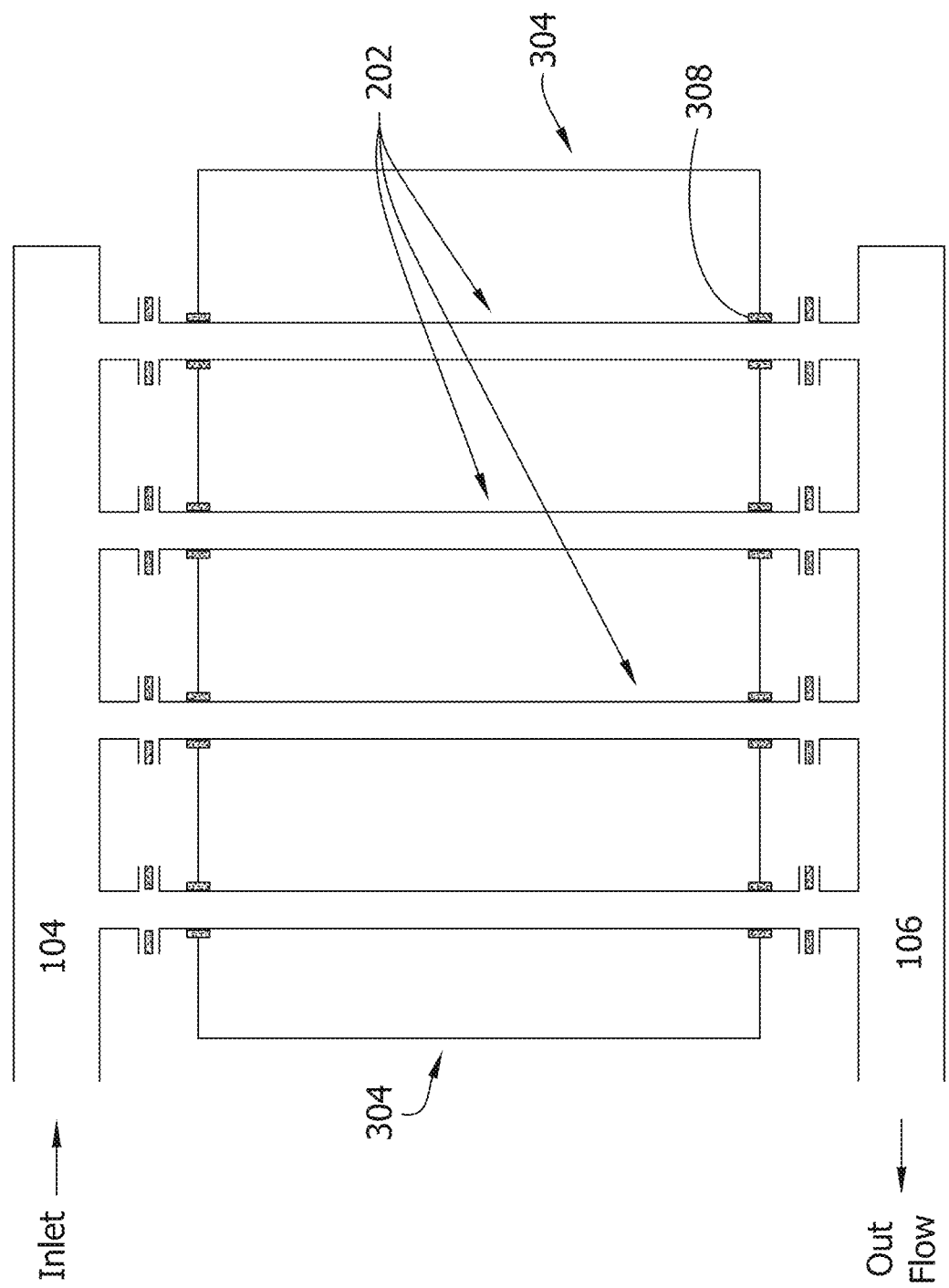
FIG. 7 provides a side view representation of the reactor system of FIG. 1 comprising a plurality of reactor tubes.

FIG. 7 shows a side view representation of one embodiment of reactor 102 comprising a plurality of reactor tubes 202. Each reactor tube 202 is arranged as described in FIGS. 3 and 4. In FIG. 7, an inlet flow of material at inlet pipe 104 (i.e., an inflow pipe arrangement or inflow pipe header 104) to be contacted with the catalyst 302 flows into the top of each reactor tube 202, contacts the catalyst 302, and is recovered at the bottom of each reactor tube 202 at outlet pipe 106 (i.e., an outflow pipe arrangement or outflow pipe header 106). Shown in FIG. 7 is the heater shell 304 and the electrical insulators 308. The shell 304 is interrupted by electrical insulators 308 such that each reactor tube 202 is electrically isolated from the other reactor tubes 202 and the other electrically conductive elements in the reactor system 100.

In other embodiments, in addition to or instead of the electrical insulators 308, the system may comprise an insulative gasket between the one or more reactor tubes and the associated inflow pipe arrangement (i.e., inflow pipe header) 104. In another embodiment, the system comprises an insulative gasket between the one or more reactor tubes and the associated outflow pipe arrangement (i.e., outflow pipe header) 106. In a still further embodiment, the system comprises a first insulative gasket between the one or more reactor tubes and the associated inflow pipe arrangement (i.e., inflow pipe header) 104 and a second insulative gasket between the one or more reactor tubes and the associated outflow pipe arrangement (i.e., outflow pipe header) 106. In various embodiments, the insulative gasket may comprise material selected from the group consisting of ceramics, nylon, polystyrene, polyvinylchloride (PVC), silicon, rubber, glass, and combinations thereof. In some embodiments, the insulative gasket may comprise a ceramic selected from the group consisting of ceramic fiber, a ceramic blanket, a ceramic board, or combinations thereof. In other embodiments, the insulative gasket may comprise material selected from the group consisting of concrete (e.g., castable insulating concrete), a fiber brick, mineral wool, or combinations thereof.

In one embodiment of the present disclosure, a method of heating a reactor system comprising a PID controller is described. The method comprises executing, by a proportional-integral-derivative (PID) controller, a cascade control scheme; and adjusting the output of the PID controller to a working setpoint in accordance with the cascade control scheme, wherein a power controller coupled to the electrical power source is responsive to the working setpoint for adjusting a current level of the electrical power source to heat each reactor tube of the plurality of reactor tubes to a desired reactor outlet temperature.

Figure 8:
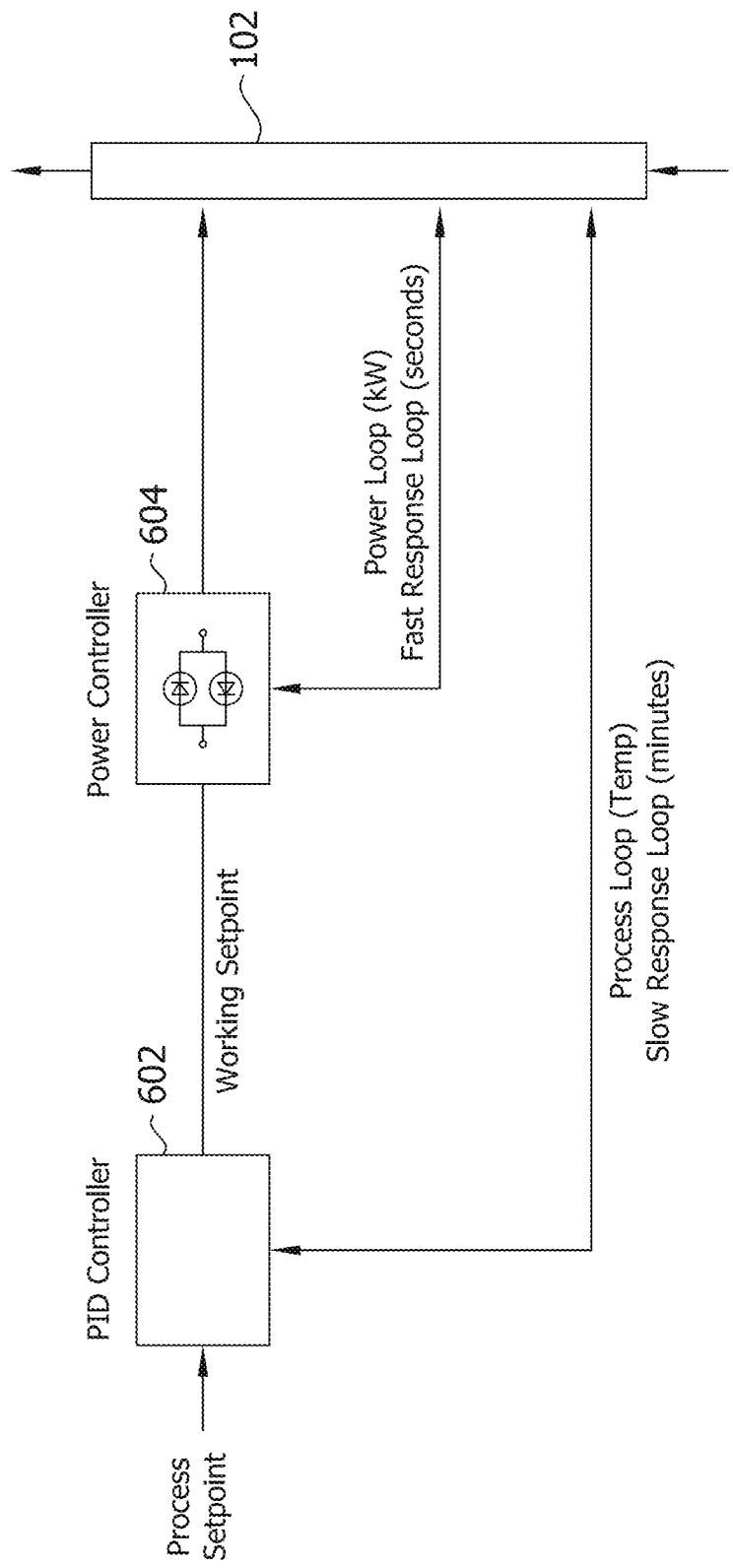
FIG. 8 illustrates a direct power control loop according to an embodiment of the reactor system.

Referring now to FIG. 8, an example of a cascade control scheme implemented by the controller 110 is shown. In this embodiment, controller 110 comprises a proportional-integral-derivative (PID) controller 602 for adjusting the electrical flow to a working setpoint and a power controller 604 responsive to the working setpoint for adjusting the current level of the power supply 108 to heat reactor 102 to achieve the desired reactor outlet temperature. PID temperature control loops tend to have a slow response (e.g., minutes) due to multiple factors, such as the thermal inertia and heat transfer to the reactor as well as the time response of the temperature sensor itself. In a conventional embodiment, the PID set up must be tuned in order to integrate the instabilities of the combustion, like flame instability, gas calorific value and flow variations, exhaust gas flow variations in the chamber, and the like. On the other hand, by introducing an accurate and direct power control loop (in kW, Volt or Ampere) inside the temperature control loop, the PID controller 602 of controller 110 greatly improves the stability, accuracy, and speed of the temperature control loop. In particular, the heat transfer to the reactor is much simpler with a quite constant heat transfer function (no more convection and radiation transfer modes). In addition, aspects of the present disclosure provide the opportunity to create a model of the heat transfer function and implement a predictive model-based temperature control loop, making the process control loop much faster than a typical PID control. The time response of the direct power control loop of power controller 604 is extremely accurate and fast. By eliminating the combustion instability, the gas calorific value variation, and the exhaust flow instabilities in the combustion chamber, the PID control loop of PID controller 602 is improved.

Although the discussion herein is directed to a PID control loop and/or PID controller, it will be understood that other controllers and control schemes, including but not limited to fuzzy logic control (FLC), programmable logic controllers (PLCs), linear quadratic regulator (LQR) control, model predictive control (MPC), adaptive control, sliding mode control, and multivariable predictive control, can be utilized for adjusting the current level of the power supply 108 to heat reactor 102 to achieve the desired reactor outlet temperature.

Further embodiments of the present disclosure are directed to galvanic isolation of reactors (e.g., reactor tubes) in a reactor heater system. Without galvanic isolation, reactor tube(s) generally need to be individually electrically insulated or isolated using an insulative material (e.g., an insulative gasket or isolating material). With galvanic isolation, the insulative gaskets or isolating material are not necessary and the reactor tubes can be directly connected (e.g., welded) to the inlet and outlet headers (i.e., inflow pipe header and outflow pipe header). This has the added benefit of making the system safer with respect to potential fluid leakages, reducing maintenance costs, and reducing downtime and capital costs. In these embodiments, the systems and methods of the present disclosure also mitigate the risks of electrical hazards to personnel. In certain embodiments, the present disclosure is directed to galvanic isolation of a system utilizing alternating current.

Although discussion is directed herein to galvanic isolation or galvanically isolating reactor tubes or the reactor heating system, it will be understood that "isolation" is intended to refer to commercially viable isolation. While it is a goal of the present disclosure to approach full galvanic isolation of the reactor tubes or the reactor heating system (i.e., to reach as close to 0 V as possible to prevent current flow at the inlets and outlets of the reactor tubes or the reactor heating system), a negligible amount of current may leak from the reaction tubes or system due to unavoidable impedance disparities or voltage potential differences. As long as the amount of current that leaks from the isolated tubes or reactor heating system is within the limits of commercial viability and/or safe operation, the tubes or system will be understood to be galvanically isolated.

In one embodiment, a method of heating a reactor system is provided. The reactor system comprises a plurality of reactor tubes, wherein each of the plurality of reactor tubes has a catalyst disposed therein and at least one electrically conductive surface. Fluid enters each reactor tube of the plurality of reactor tubes via an associated inflow pipe header and exits each reactor tube of the plurality of reactor tubes via an associated outflow pipe header. The method comprises galvanically isolating the plurality of reactor tubes such that each of the plurality of reactor tubes can be directly connected to the inflow pipe header and the outflow pipe header; providing electrical energy to the at least one electrically conductive surface of each reactor tube of the plurality of reactor tubes; and individually adjusting a current level of the electrical energy provided to the at least one electrically conductive surface of each reactor tube of the plurality of reactor tubes to individually control the temperature of each reactor tube and the catalyst disposed therein.

In certain embodiments of this method, each of the plurality of reactor tubes are not electrically insulated.

The plurality of reactor tubes may be galvanically isolated, for example, by using a plurality of power controllers, the plurality of power controllers mirroring each other in order to achieve a commercially acceptable voltage and/or current level at the inflow pipe header and outflow pipe header (i.e., only negligible amounts of voltage and current).

In some embodiments, in addition to the galvanic isolation, one or more grounding points may be provided in the system. For example, a grounding point at the inlet of each reactor tube of the one or more reactor tubes, a grounding point at the outlet of each reactor tube of the one or more reactor tubes, or a grounding point at the inlet of each reactor tube and a grounding point at the outlet of each reactor tube of the one or more reactor tubes.

In certain embodiments, for each reactor tube of the plurality of reactor tubes, electrical energy is supplied from a plurality of three-phase power sources. In other embodiments, for each reactor tube of the plurality of reactor tubes, electrical energy is supplied from a plurality of three-phase power sources to a plurality of transformers. In either configuration, the resulting three-phase electrical energy may then be directed to each reactor tube to form one or more individually controllable heating zones within the reactor tube. For example, two or more, three or more, four or more, five or more, six or more, seven or more, eight or more, nine or more, or ten or more heating zones.

In one embodiment, with respect to each reactor tube of the plurality of reactor tubes, the first phase from each of the plurality of transformers may be directed to a first location on the electrically conductive surface of the reactor tube; the second phase from each of the plurality of transformers may be directed to a second location on the electrically conductive surface of the reactor tube; and the third phase from each of the plurality of transformers may be directed to a third location on the electrically conductive surface of the reactor tube. In this embodiment, two or more individually controllable heating zones may be created within the reactor tube.

Figure 12A:
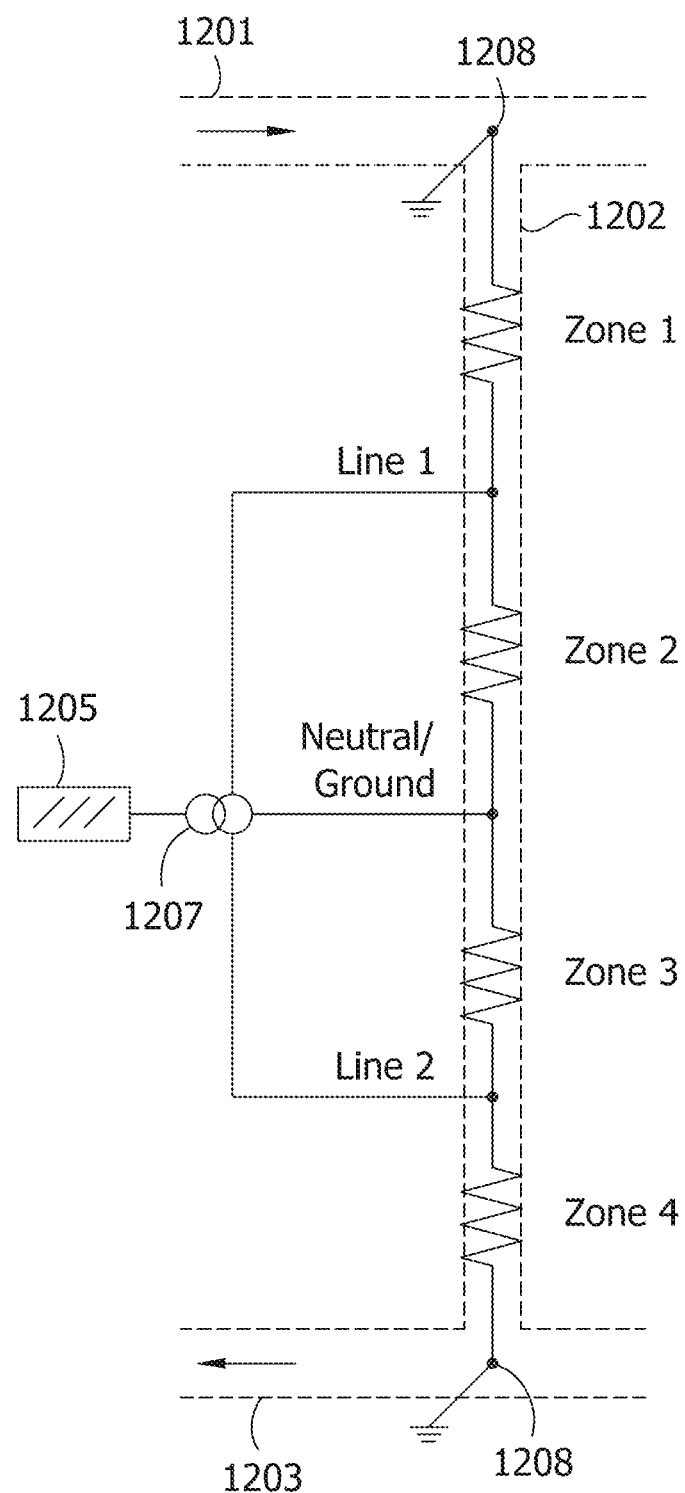
FIG. 12A illustrates an electrical diagram of one configuration of direct electrical heating and galvanic isolation of a reactor tube.
Figure 12B:
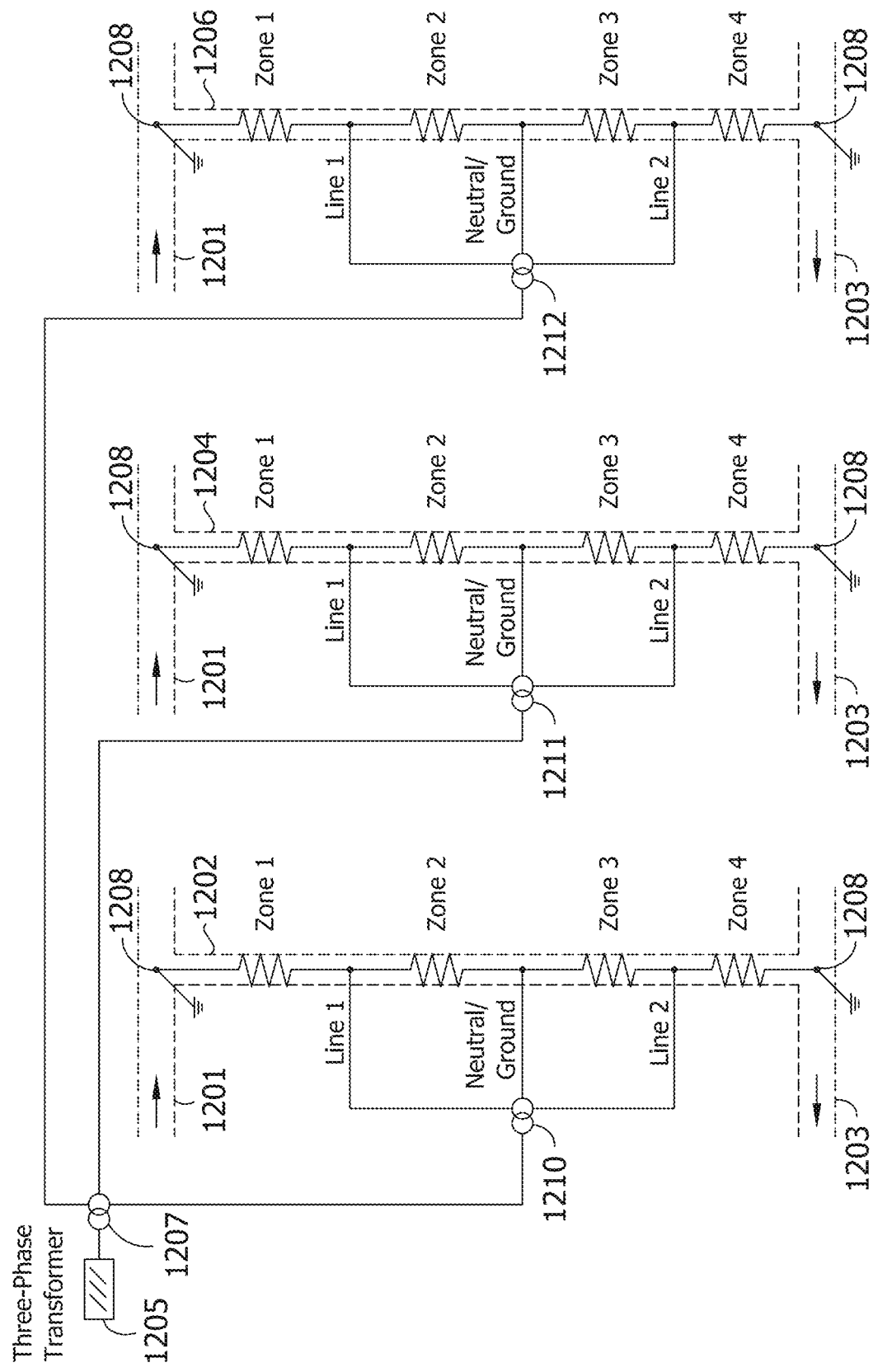
FIG. 12B illustrates an electrical diagram of one configuration of direct electrical heating and galvanic isolation of multiple reactor tubes.
Figure 13:
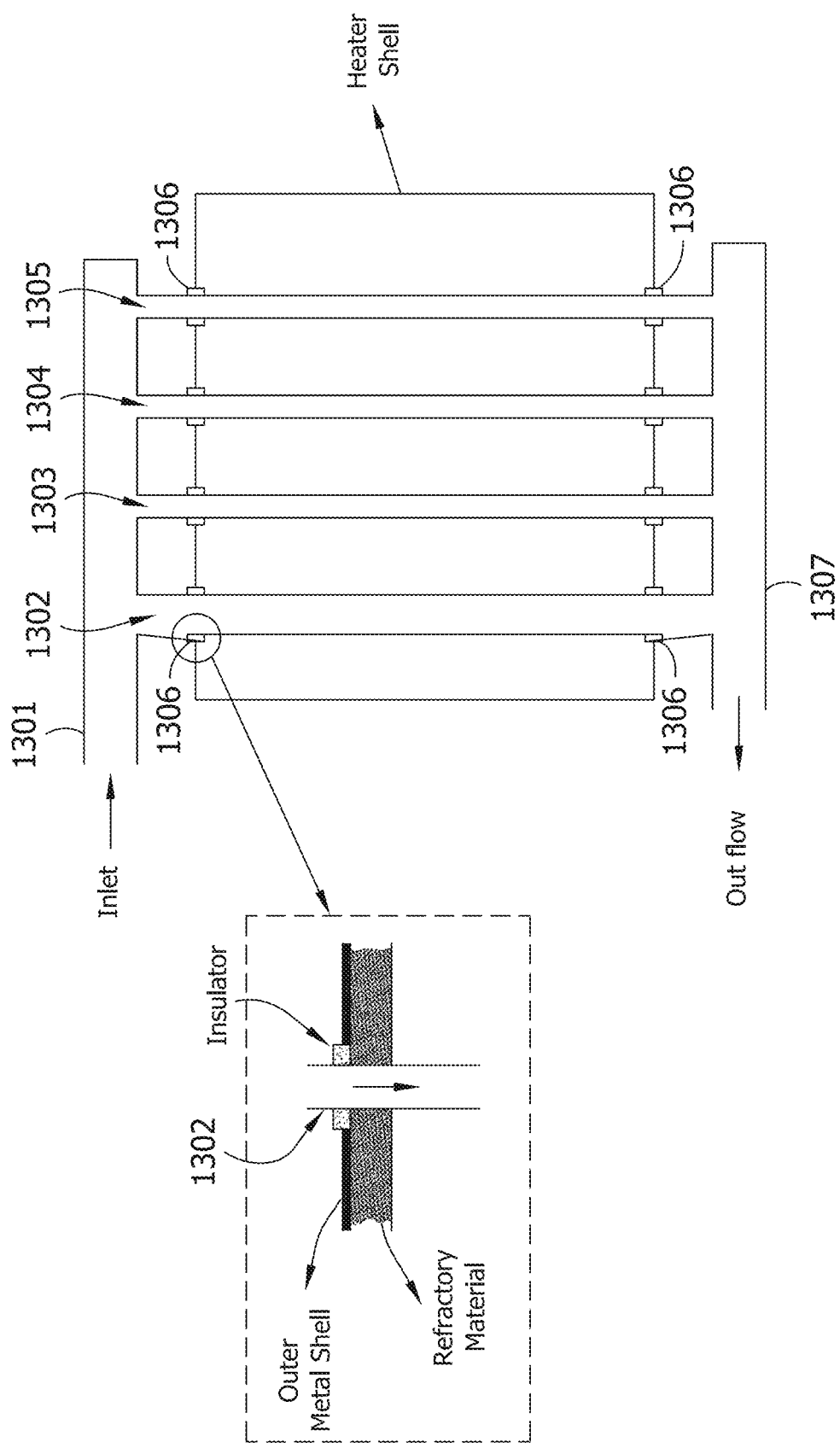
FIG. 13 provides a side view of a heater system according to one embodiment.

In some configurations, insulative gaskets may be required at the inlet and outlet of each reactor tube (e.g., as shown in FIG. 7) and/or insulation may be required between the outer shell and the reactor tube (e.g., as shown in FIG. 13). The insulative gaskets are typically subjected to high temperatures and pressures and the insulators may be subjected to high temperatures. However, in certain embodiments of the present disclosure, the direct electrical heating of the reactor tubes is arranged in such a manner as to eliminate the need for insulative gaskets at the inlet and outlet of each reactor tube and/or insulators between the outer shell and the reactor tube. For example, the individual tubes may be galvanically isolated (e.g., as described in further detail in FIGS. 10-12B) to remove the need for insulative gaskets or insulators. In another example, a space between the outer shell and reactor tube may be used to reduce the risk of electrical currents flowing between the direct electrical heating process and the shell of the reactor heating system and the other components of the reactor system (e.g., as described in detail in FIG. 9). By eliminating these insulative gaskets and/or insulators between the outer shell and the reactor tube, it is possible to remove possible points of failure in the system and reduce materials and maintenance costs.

Figure 9:
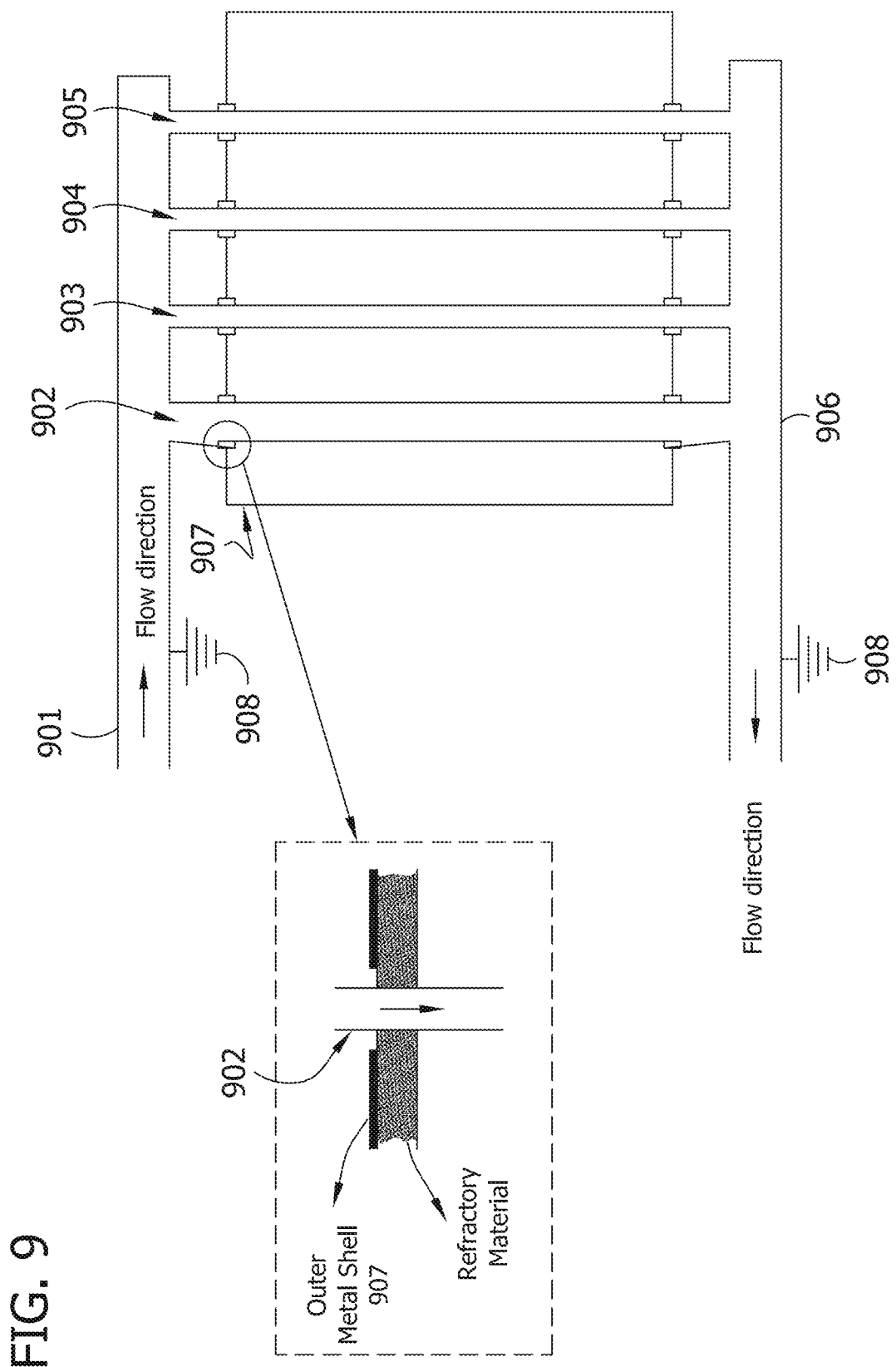
FIG. 9 provides a diagram of a galvanic isolation system of one embodiment.

FIG. 9 illustrates one embodiment of reactor heating systems and methods of the present disclosure comprising a plurality of reactor tubes, as a cut-through view of the reactor system. The direct electrical heating of the reactor tubes is illustrated and explained in further detail below in FIG. 10.

In FIG. 9, an inlet pipe 901 is shown at the top with an arrow indicating the flow direction. The material within this pipe is the material (e.g., a fluid) intended to be heated in the reactor tubes. At a 90° angle from the inlet pipe, four reactor tubes 902, 903, 904, and 905 are shown. The material flows through each of these reactor tubes in parallel and is collected in an outlet pipe 906 shown at the bottom. In various embodiments, the inlet pipe 901 is an inflow pipe header or inflow pipe arrangement and the outlet pipe 906 is an outflow pipe header or outflow pipe arrangement. As explained in further detail with respect to FIG. 10, in certain embodiments, the reactor tubes are galvanically isolated from the inlet pipe 901 and the outlet pipe 906.

FIG. 9 contains an expanded view inset showing the connection of the outer shell 907 of the reactor system to each reactor tube. The outer metal shell 907 of the reactor heater system, shown as a thick line, is not directly in contact with the wall of the reactor tubes. Instead, the shell is connected to refractory material on either side of the tube, with a space between the outer shell and the reactor tube.

This configuration provides numerous benefits. In other configurations, insulative gaskets may be required at the inlet and outlet of each reactor tube and/or insulators may be required between the outer shell and the reactor tube. As explained in further detail herein, in certain embodiments, the direct electrical heating of the reactor tubes is arranged in such a manner as to remove the need for insulative gaskets at the inlet and outlet of each reactor tube. A space between the outer shell and reactor tube may be used instead of an insulator to reduce the risk of electrical current flow between the direct electrical heating process and the shell of the reactor heating system. By eliminating these insulative gaskets and/or insulators, it is possible to remove possible points of failure in the system and reduce materials and maintenance costs.

In certain embodiments, the refractory material may be selected from the group consisting of ceramics, nylon, polystyrene, polyvinylchloride (PVC), silicon, rubber, glass, and combinations thereof. In some embodiments, the refractory material may be a ceramic selected from the group consisting of ceramic fiber, a ceramic blanket, a ceramic board, or combinations thereof. In other embodiments, the refractory material may be selected from the group consisting of concrete (e.g., castable insulating concrete), a fiber brick, mineral wool, or combinations thereof.

In some embodiments, the outer shell of the reactor heating system may comprise a metal. For example, the outer shell may comprise low carbon steel. In various embodiments, the outer shell is about 1/8", about 1/6", about 1/4", about 1/2", or about 1" thick. In other embodiments, the outer shell is from about 1/8" to about 5", from about 1/8" to about 4", from about 1/8" to about 3", from about 1/8" to about 2", from about 1/6" to about 2", from about 1/6" to about 1", or from about 1/6" to about 1/2" thick.

In certain embodiments wherein there is a space between the outer shell of the reactor system and the reactor tube(s), the space may be about 0.1 mm or greater, about 0.5 mm or greater, about 1 mm or greater, about 2 mm or greater, about 3 mm or greater, about 4 mm or greater, about 5 mm or greater, about 6 mm or greater, about 7 mm or greater, about 8 mm or greater, about 9 mm or greater, about 10 mm or greater, about 15 mm or greater, about 20 mm or greater, about 25 mm or greater, about 30 mm or greater, about 35 mm or greater, about 40 mm or greater, about 45 mm or greater, or about 50 mm or greater. For example, from about 1 mm to about 100 mm, from about 2 mm to about 90 mm, from about 3 mm to about 80 mm, from about 4 mm to about 70 mm, from about 5 mm to about 60 mm, from about 6 mm to about 50 mm, from about 7 mm to about 50 mm, from about 8 mm to about 50 mm, from about 9 mm to about 50 mm, or from about 10 mm to about 50 mm.

As described in further detail below, in a multi-phase electrical current heating arrangement, multiple power controllers may be utilized that mirror each other in order to move from 0 volt at the inlet to 0 volt at the outlet. For example, in one embodiment, a plurality of reactor tubes are galvanically isolated using a plurality of power controllers, the plurality of power controllers mirroring each other in order to move from zero volts at the inlet header to zero volts at the outlet header. This allows the system to be referred to as "zero net voltage," and for the plurality of reactor tubes to be galvanically isolated.

In another embodiment, a multi-phase electrical current heating arrangement comprises multiple power controllers that mirror each other and create multiple heating zones within a single reactor tube and galvanically isolate the single reactor tube.

In certain embodiments, the reactor heating system may comprise one or more grounding points in addition to the galvanic isolation. For example, as shown in FIG. 9.

FIG. 9 shows grounding points (e.g., earth) 908 connected to the inlet pipe and the outlet pipe. In certain embodiments, the grounding points may be connected or directed to the same grounding potential. In some embodiments, the grounding points 908 may be located away from the direct inlet/outlet of the first reactor tube, but still within a reasonable distance to ensure that the inlet and outlet pipes are adequately grounded and at the same potential. In one embodiment, the grounding points 908 are as close to the inlet/outlet of the reactor tube(s) as practicable.

It is believed that by placing grounding points 908 at the inlet and outlets of the reactor tubes, and spacing the outer shell of the reactor system away from the walls of the reactor tubes, the system can be safely operated without electrical insulation (e.g., gaskets) on each reactor tube. This can be particularly important in high temperature reactions, where typical gasket materials may not be able to withstand the conditions or may be prohibitively expensive.

Although one grounding point is illustrated at the inlet of the first reactor tube and one grounding point at the outlet of the first reactor tube, in certain embodiments the reactor system may comprise multiple grounding points. For example, a grounding point at the inlet of each reactor tube of the one or more reactor tubes, a grounding point at the outlet of each reactor tube of the one or more reactor tubes, or a grounding point at the inlet of each reactor tube and a grounding point at the outlet of each reactor tube of the one or more reactor tubes. In certain embodiments, the grounding points may be connected or directed to the same grounding potential.

Figure 10:
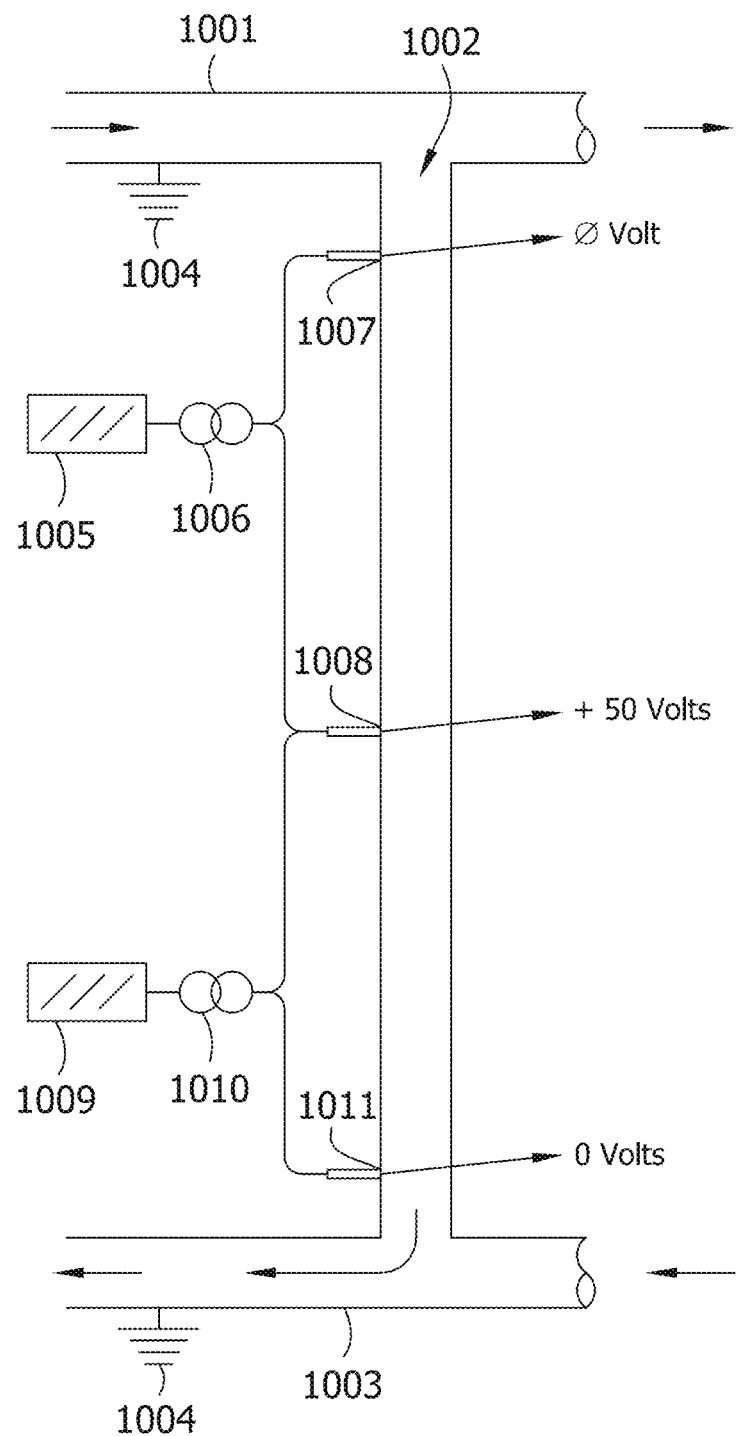
FIG. 10 provides a diagram of an AC galvanic isolation system illustrating the connection of current to the tube.

FIG. 10 shows the heating of a reactor system comprising direct electrical heating. This figure shows a cut-through view of the reactor system. One reactor tube is show. However, the system may comprise multiple reactor tubes. An inlet pipe 1001 is shown at the top with an arrow indicating the flow direction. The material within this pipe is the material (e.g., a fluid) intended to be heated in the reactor tube. At a 90° angle from the inlet pipe, a reactor tube 1002 is shown. The material flows through the reactor tube and is collected in an outlet pipe 1003 shown at the bottom. In various embodiments, the inlet pipe 1001 is an inflow pipe header or inflow pipe arrangement and the outlet pipe 1003 is an outflow pipe header or outflow pipe arrangement. As explained in further detail herein, in certain embodiments, the reactor tubes are galvanically isolated from the inlet pipe 1001 and the outlet pipe 1003.

Grounding points 1004 are present on the inlet pipe and outlet pipe and utilized in the same manner as described in FIG. 9. In certain embodiments, the grounding points may be bonded or connected to the same ground.

In FIG. 10, two power supply sources are utilized to form two "zones" within the reactor tube. The first AC power supply 1005 is connected to a transformer 1006, and power is then directed to connection points 1007 and 1008 on the reactor tube.

The second AC power supply 1009 is connected to a transformer 1010, and power is directed to connection points 1008 and 1011.

The power supplied from transformer 1006 to connection points 1007 and 1008, and from transformer 1010 to connection points 1008 and 1011, is such that 0 V is present at connection point 1007, +50 V is present at connection point 1008, and a 0V is present at connection point 1011. This results in the same voltage potential between the top and bottom of the reactor tube and galvanic isolation of the reactor tube.

Although the reaction systems may be described herein as having the same voltage potential between the top and bottom of the reactor tube(s), it will be understood that in certain embodiments the voltage at the inlet and outlet of the reactor tube(s) may not be exactly zero. For example, in one embodiment, the inlet or outlet of the reactor tube(s) may have a voltage of about 5 V or less, about 4 V or less, about 3 V or less, about 2 V or less, about 1 V or less, about 0.5 V or less, or about 0.25 V or less. In some embodiments, the inlet or outlet of the reactor tube(s) may have a voltage of from about 0.2 V to about 1 V. In other embodiments, the inlet or outlet of the reactor tube(s) (i.e., inflow pipe header and outflow pipe header) may have a voltage of from about 0.1 V to about 20 V, from about 0.1 V to about 15 V, from about 0.1 V to about 10 V, from about 0.1 V to about 9 V, from about 0.1 V to about 8 V, from about 0.1 V to about 7 V, from about 0.1 V to about 6 V, from about 0.1 V to about 5 V, from about 0.1 V to about 4 V, from about 0.1 V to about 3 V, from about 0.1 V to about 2 V, from about 0.1 V to about 1 V, or from about 0.1 V to about 0.5 V. The grounding points on the inlet pipe and outlet pipe (i.e., inflow pipe header and outflow pipe header) allow for the grounding of any such residual voltage, such that the operator facing components of the system (e.g., the inlet/outlet pipes, the reactor shell, etc.) do not pose a risk to the operator.

Similarly, the system as described in FIG. 10 may comprise certain "leakage" of the current from the reactor tube direct electrical heating operation. In certain embodiments, from about 1% to about 5% of the total current supplied to the system may be present at the inlet or outlet of the reactor tube(s). In other embodiments, about 10% or less, about 9% or less, about 8% or less, about 7% or less, about 6% or less, about 5% or less, about 4% or less, about 3% or less, about 2% or less, about 1% or less, about 0.5% or less, about 0.25% or less, or about 0.1% or less of the total current supplied to the system may be present at the inlet or outlet of the reactor tube(s). The grounding points on the inlet pipe and outlet pipe allow for the grounding of any such residual current, such that the operator facing components of the system (e.g., the inflow/outflow pipe headers, the reactor shell, etc.) do not pose a risk to the operator.

The connection point is such that electrical energy is supplied directly to the reactor tube (e.g., to an electrically conductive surface of the reactor tube) or to an electrically conductive surface connected to the reactor tube. The direct electrical heating of a reactor tube, materials of construction, and electrical configurations are described in further detail above.

In FIG. 10, the connection points 1007, 1008, and 1011 may be connected directly to the reactor tube. As explained elsewhere herein, it is one aspect of the present disclosure to supply electrical energy to an electrically conductive surface (e.g., the wall of reactor tube or an external conductor electrically coupled to the reactor tube) present on reactor tube. The current provided to the reactor tube can be modulated to control the temperature of the reactor tube and/or catalyst within the reactor tube and maintain a suitable temperature gradient. Thus, direct electrical heating of the reactor tube allows for a finer and more accurate control of the temperature of the reactor tube. This results in improvements in the yield/quality of the desired product, an increase in throughput, extended catalyst life, etc.

Figure 11:
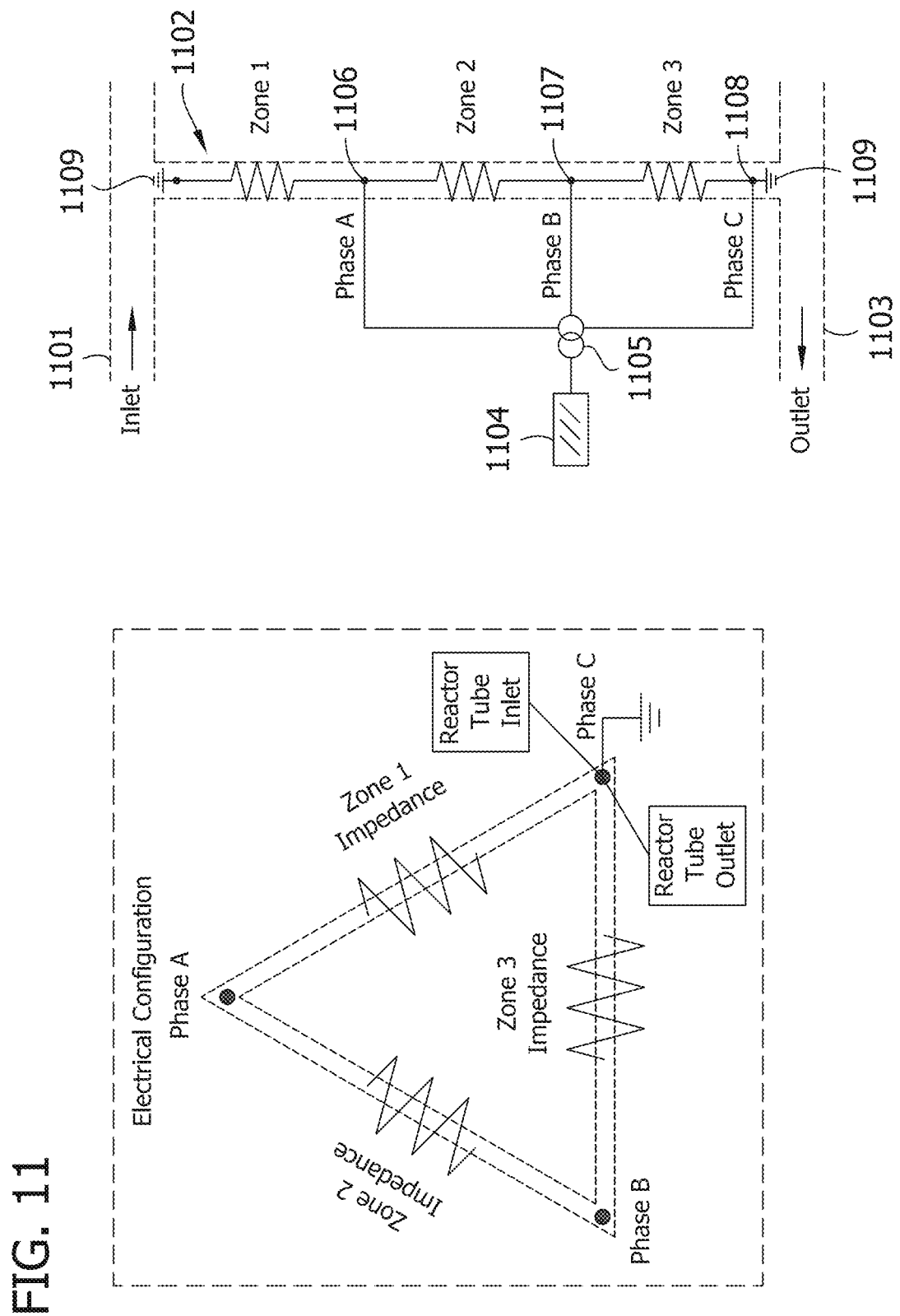
FIG. 11 illustrates an electrical diagram superimposed upon a reactor heating system comprising direct electrical heating.

FIG. 11 shows an electrical diagram superimposed upon a reactor heating system comprising direct electrical heating. This figure shows a cut-through view of the reactor system. One reactor tube is shown in FIG. 11. However, the system may comprise multiple reactor tubes. For example, multiple reactor tubes in parallel between inlet pipe 1101 and outlet pipe 1103.

An inlet pipe 1101 is shown at the top with an arrow indicating the flow direction. The material within this pipe is the material (e.g., a fluid) intended to be heated in the reactor tube. At a 90° angle from the inlet pipe, a reactor tube 1102 is shown. The material flows through the reactor tube and is collected in an outlet pipe 1103 shown at the bottom. In various embodiments, the inlet pipe 1101 is an inflow pipe header or inflow pipe arrangement and the outlet pipe 1103 is an outflow pipe header or outflow pipe arrangement.

Grounding points 1109 are present as shown in FIG. 11. In certain embodiments, the grounding points may be bonded or connected to the same ground.

In FIG. 11, one power supply source and the grounding points 1109 are utilized to form three "zones" within the reactor tube. The AC power supply 1104 is connected to the primary of a transformer 1105, and its three-phase power is then directed to connection points 1106, 1107, and 1108 on the reactor tube. In this embodiment, the power supplied from transformer 1105 is multi-phase. Distinct phases A, B, and C are directed to each of the connection points 1106, 1107, and 1108 as shown.

As described elsewhere herein, the reactor tube comprises an electrically conductive surface such that, when electrical energy is applied to the electrically conductive surface, the reactor tube is heated by current flowing through the tube (IR). The heating of the reactor tube subsequently heats any catalyst or reactor fluid disposed therein. The impedance of the tubes act as a resistive load for the circuit, as indicated by the resistors superimposed on the tube in FIG. 11. The power supplied from transformer 1105 to connection points 1106, 1107, and 1108 is such that the electrical impedance in the reactor tube is equal between i) top grounding point 1109 and connection point 1106, ii) connection points 1106 and 1107, and iii) connection points 1107 and 1108. That is, Zone 1, Zone 2, and Zone 3 have an equivalent (or nearly equivalent) electrical impedance. This equivalent (or nearly equivalent) electrical impedance is intended to result in equivalent (or nearly equivalent) energy being provided to each zone, and thus equivalent (or nearly equivalent) heating in each zone.

The presence of grounding points 1109 allow the reactor tube to have the same voltage potential between the top and bottom of the reactor tube, and to be galvanically isolated.

The inset "Electrical Configuration" schematic on the left illustrates a corner-grounded transformer configuration such as FIG. 11, with the ground bond at the same potential on the top and bottom of the reactor tube. The inset schematic of FIG. 11 further illustrates how the secondary of a corner-grounded transformer can be connected to heat reactor tubes to supply power to three zones. As explained above, the reactor tube of FIG. 11 is electrically partitioned into thirds, creating three zones (e.g., Zone 1, Zone 2, and Zone 3). These zones have approximately equivalent impedances as shown with the resistors superimposed on the tube. Because the transformer secondary is configured as a corner-grounded delta, one of the phases (i.e., Phase C, in this case) is grounded. The "Electrical Configuration" schematic superimposes the reactor tube over the delta configuration to provide an electrical perspective of how the reactor tubes are connected to the transformer secondary.

Although FIG. 11 is directed to a single reactor tube, a single power source, and a single transformer, it will be appreciated that multiple alternative configurations are within the scope of the present disclosure. For example, the reactor heating system may comprise multiple reactor tubes with similar connections and galvanic isolation. In another example, each reactor tube may comprise more than one power source or more than one transformer. Additionally, multiple connection points may be used to direct electrical energy to the electrically conductive surface of the reactor tube to create more than three zones. In various embodiments, multiple transformers may be added in parallel or at subsequent times to meet the operational requirements for the reactor tube(s).

FIG. 12A illustrates one configuration of direct electrical heating and galvanic isolation of a reactor tube. The reactor tube uses a split-phase transformer and three-wire configuration (described in further detail below). Although a single reactor tube is shown, it will be understood that the system may comprise multiple reactor tubes. For example, multiple reactor tubes in parallel between inlet pipe 1201 and outlet pipe 1203.

Power is directed from power supply 1205 to a split-phase, single-phase transformer 1207, and then to reactor tube 1202 as shown. A split-phase, single-phase transformer uses three conductors to connect to a single-phase circuit. These are shown in FIG. 12A as Line 1, Line 2, and Neutral/Ground. Line 1, for example, may be connected to the top of the single-phase transformer winding. Line 2, for example, may be connected to the bottom of the single-phase transformer winding. Neutral/Ground, for example, may be connected to the middle of the single-phase transformer winding.

The reactor tube is divided into four zones—Zone 1, Zone 2, Zone 3, and Zone 4. Each of the reactor tube's four zones are divided such that each have approximately equivalent impedances. This ensures a balance on the circuit loads. As explained elsewhere herein, the reactor tube comprises an electrically conductive surface such that, when electrical energy is applied to the electrically conductive surface, the reactor tube is heated. The impedance of the tube acts as a resistive load for the circuit, as indicated by the resistors superimposed on the tube. Each tube's inlet, outlet, and midpoint is directly or indirectly connected to the neutral/ground connection of the split-phase transformer.

In FIG. 12A, Line 1 and Line 2 are connected at approximately ¼ and ¾, respectively, of the length of the tube. The connection points of Line 1 and Line 2 are also the "electrical midpoint" of the top half and bottom half of the tube's impedance. That is, Line 1 is connected at the midpoint of the top grounding point 1208 and the grounding point of the Neutral/Ground, and Line 2 is connected at the midpoint of the Neutral/Ground and the bottom grounding point 1208. This approach allows the reactor shell, inlets, outlets, and any other external connections (with the exception of Lines 1 and 2) to be grounded, improving the operational safety of the design.

In certain other configurations, the Neutral/Ground connection point and ground may be removed. In this configuration, the space between the connection points of Line 1 and Line 2 will have twice the impedance (and twice the voltage) as compared to Zone 2 or Zone 3.

In certain embodiments, multiple three-phase transformers can be used in parallel to increase the total current flow through the reactor tube. The output from each phase and/or each transformer may be controlled accordingly so that current flow may be increased or decreased to optimize the reactor tube heating.

FIG. 12B illustrates one configuration of direct electrical heating and galvanic isolation of multiple reactor tubes, similar to FIG. 12A. In FIG. 12B, a single power source and three-phase transformer are used to provide three phase power. Each phase is directed to a separate reactor tube or tubes operating in parallel.

Power is provided from an AC power supply 1205 to a first transformer 1207. The three-phase power from transformer 1207 is then provided in distinct phases to reactor tubes 1202, 1204, and 1206. Each phase is first supplied to a split-phase, single-phase transformer, which then supplies power to the reactor tube.

For example, Phase A from first transformer 1207 is directed to a split-phase, single-phase transformer 1210, and power is then supplied to reactor tube 1202 via Line 1 and Line 2. Phase B from first transformer 1207 is directed to a split-phase, single-phase transformer 1211, and power is then supplied to reactor tube 1204 via Line 1 and Line 2. Phase C from first transformer 1207 is directed to a split-phase, single-phase transformer 1212, and power is then supplied to reactor tube 1206 via Line 1 and Line 2.

FIG. 12B otherwise operates in a similar manner to FIG. 12A.

FIG. 13 shows one embodiment of the reactor heating system of the present disclosure comprising insulators. In contrast to the reactor system of FIG. 9, FIG. 13 utilizes insulators 1306 where the outer shell contacts the reactor tubes 1302, 1303, 1304, and 1305. As shown in the expanded view portion of FIG. 13, the insulator forms a physical barrier between the outer metal shell of the reactor system and the reactor tube. This insulator acts to electrically insulate the reactor tubes from the shell. In certain embodiments, the insulators 1306 may also act to ensure that the reactor tubes are insulated from one another. In this configuration, any electrical energy supplied to the reactor tubes for direct electrical heating is contained within the system due to the insulators. In certain other embodiments, the inlet and outlet to each reactor pipe may contain an insulative gasket to insulate the reactor tubes from the other components of the system. Through the use of insulators 1306 or insulative gaskets, the inlet and outlet pipes 1301 and 1307 may not need to have grounding points as shown in FIG. 9. In various embodiments, the inlet pipe 1301 is an inflow pipe header or inflow pipe arrangement and the outlet pipe 1307 is an outflow pipe header or outflow pipe arrangement.

Figure 14:
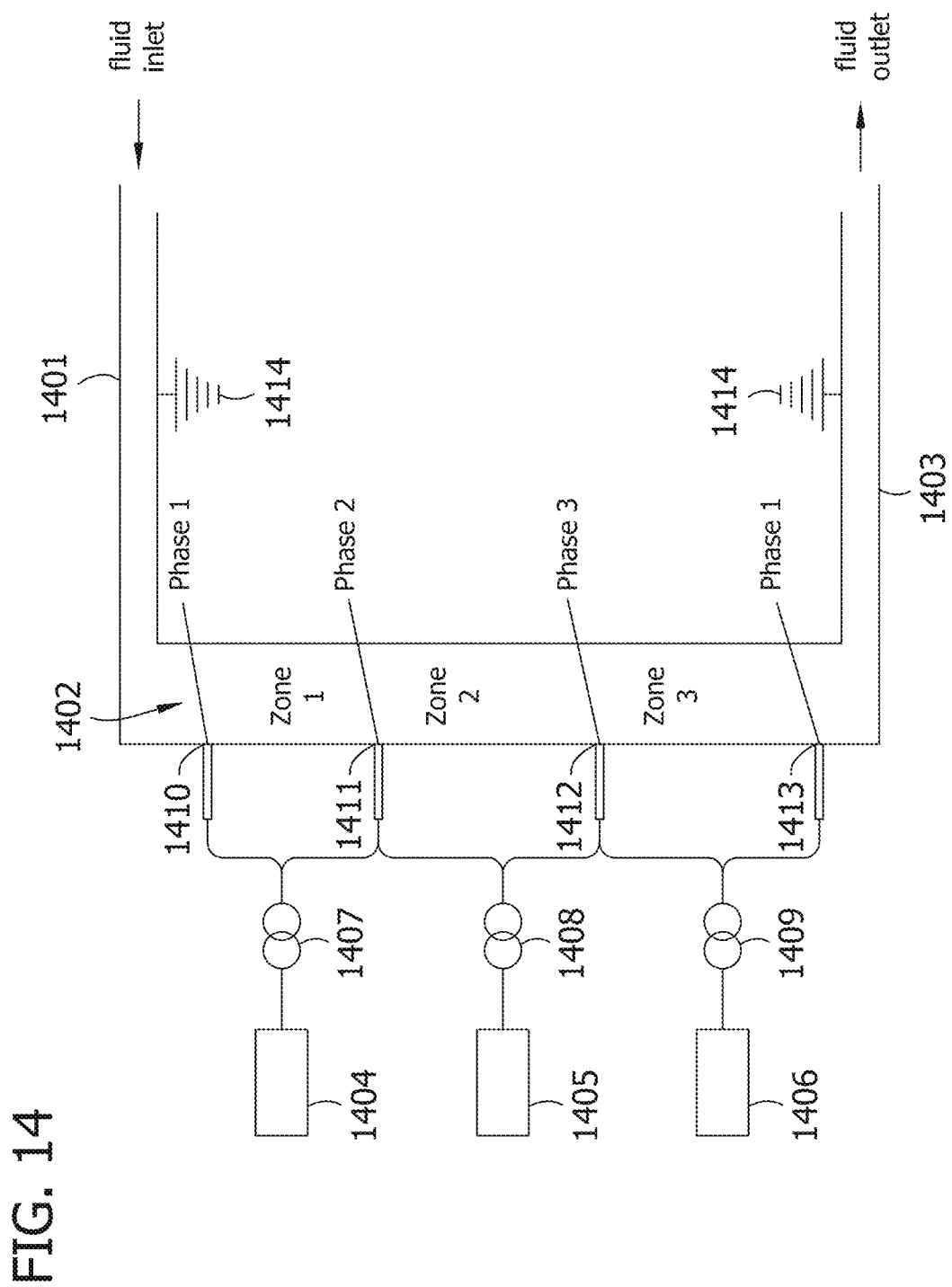
FIG. 14 provides a diagram of a galvanic isolation system comprising multiple heating zones.

FIG. 14 shows a diagram of a galvanic isolation system comprising multiple heating zones An inlet pipe 1401 is shown at the top with an arrow indicating the flow direction. The material within this pipe is the material (e.g., a fluid) intended to be heated in the reactor tubes. At a 90° angle from the inlet, reactor tube 1402 is shown with multiple heating zones. Although one reactor tube is shown, the configuration of FIG. 14 is equally applicable to a reactor system comprising multiple reactor tubes. The material flows through the reactor tube and is collected in an outlet pipe 1403 shown at the bottom. In various embodiments, the inlet pipe 1401 is an inflow pipe header or inflow pipe arrangement and the outlet pipe 1403 is an outflow pipe header or outflow pipe arrangement. As explained in further detail below, in certain embodiments, the reactor tubes are galvanically isolated from the inlet pipe 1401 and the outlet pipe 1403.

Three zones are formed within the reactor tube 1202 by multiple AC power supplies (1404, 1405, and 1406) and transformers (1407, 1408, and 1409) acting in parallel. In certain embodiments, the voltage supplied from each AC power supply is the same. In other embodiments, the voltage supplied from each AC power supply is different.

The first AC power supply 1404 is connected to a first transformer 1407, and power is then directed to connection points 1410 and 1411 on the reactor tube. Zone 1 of the reactor tube is formed between connection point 1410 and connection point 1411.

The second AC power supply 1405 is connected to a second transformer 1408, and power is then directed to connection points 1411 and 1412 on the reactor tube. Zone 2 of the reactor tube is formed between connection point 1411 and connection point 1412.

The third AC power supply 1406 is connected to a third transformer 1409, and power is then directed to connection points 1412 and 1413 on the reactor tube. Zone 3 of the reactor tube is formed between connection point 1412 and connection point 1413.

Grounding points 1414 are attached to the inlet pipe and outlet pipe. The grounding points 1414 may be located away from the direct inlet/outlet of the reactor tube, but still within a reasonable distance to ensure that the inlet and outlet pipes are adequately grounded. In certain embodiments, the grounding points are as close to the inlet/outlet of the reactor tube as possible.

Figure 15:
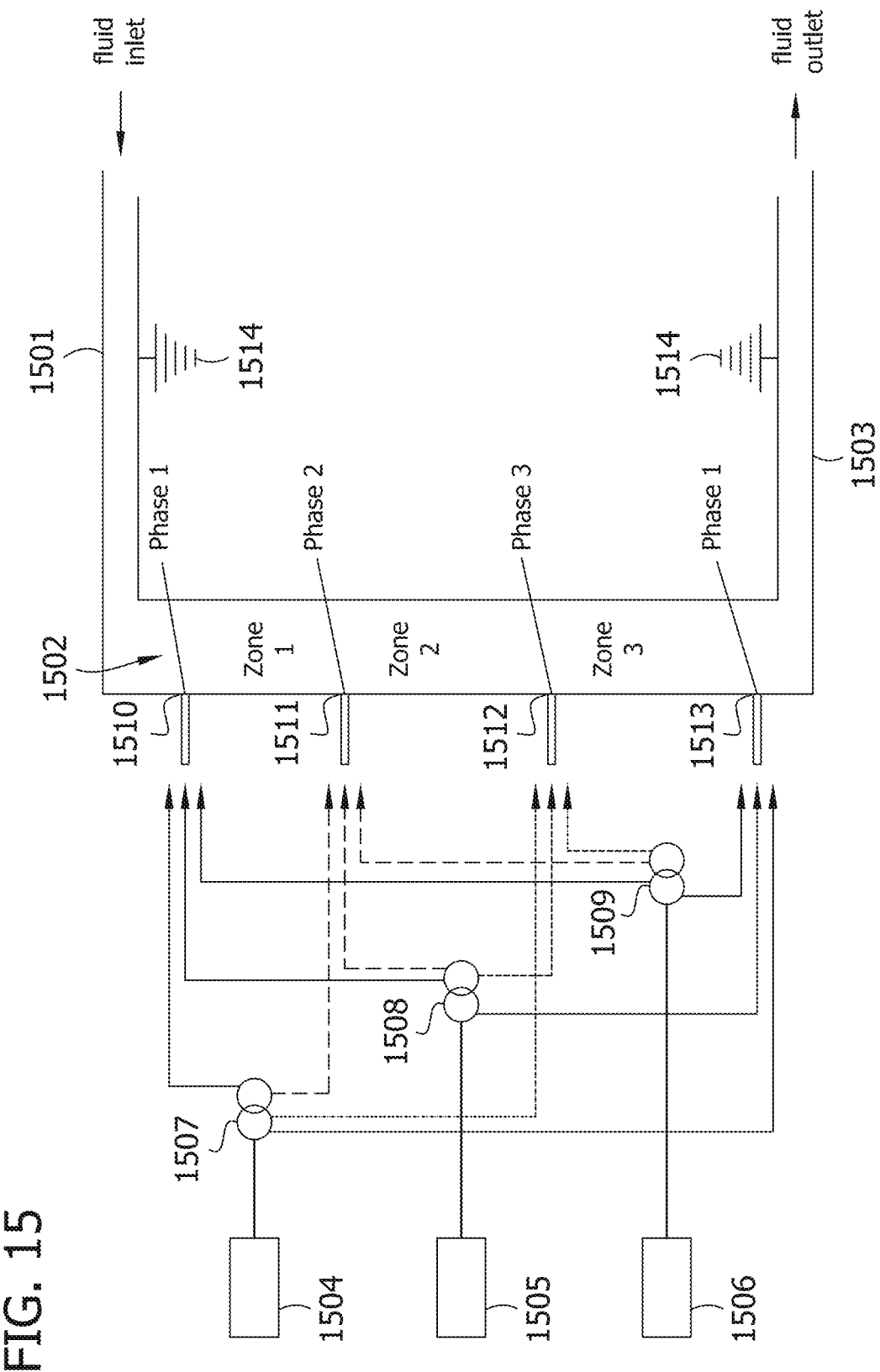
FIG. 15 provides a diagram of a 3-phase galvanic isolation system comprising multiple heating zones.

FIG. 15 shows an alternative configuration of FIG. 14. FIG. 15 shows an inlet pipe 1501 at the top with an arrow indicating the flow direction. The material within this pipe is the material (e.g., a fluid) intended to be heated in the reactor tubes. At a 90° angle from the inlet, reactor tube 1502 is shown with multiple heating zones. Although one reactor tube is shown, the configuration of FIG. 15 is equally applicable to a reactor system comprising multiple reactor tubes. The material flows through the reactor tube and is collected in an outlet pipe 1503 shown at the bottom. In various embodiments, the inlet pipe 1501 is an inflow pipe header or inflow pipe arrangement and the outlet pipe 1503 is an outflow pipe header or outflow pipe arrangement. As explained in further detail below, in certain embodiments, the reactor tubes are galvanically isolated from the inlet pipe 1501 and the outlet pipe 1503.

Three zones are formed within the reactor tube 1502 by multiple AC power supplies (1504, 1505, and 1506) and transformers (1507, 1508, and 1509) acting in parallel.

The first AC power supply 1504 is connected to a first transformer 1507. The second AC power supply 1505 is connected to a second transformer 1508. The third AC power supply 1506 is connected to a third transformer 1509.

In one embodiment of FIG. 15, the transformers (1507, 1508, and 1509) are three-phase transformers. In another embodiment of FIG. 15, the AC power supplies (1504, 1505, and 1506) are three-phase power supplies and the transformers (1507, 1508, and 1509) are three-phase transformers.

The first phase produced from each of transformer 1507, 1508, and 1509 is directed to the "Phase 1" connection points 1510 and 1513. The second phase produced from each transformer 1507, 1508, and 1509 is directed to the "Phase 2" connection point 1511. The third phase produced from each transformer 1507, 1508, and 1509 is directed to the "Phase 3" connection point 1512. In this way, three distinct heating zones of the reactor tube can be produced. Zone 1 between connection points 1510 and 1511; Zone 2 between connection points 1511 and 1512; and Zone 3 between connection points 1512 and 1513.

In certain embodiments, the current supplied to Zone 1, Zone 2, and Zone 3 is the same. In other embodiments, the current supplied to Zone 1, Zone 2, and Zone 3 is different.

Grounding points 1514 are attached to the inlet pipe and outlet pipe. In certain embodiments, the grounding points may be connected or directed to the same ground. The grounding points 1514 may be located away from the direct inlet/outlet of the reactor tube, but still within a reasonable distance to ensure that the inlet and outlet pipes are adequately grounded. In certain embodiments, the grounding points are as close to the inlet/outlet of the reactor tube as possible.

Figure 16:
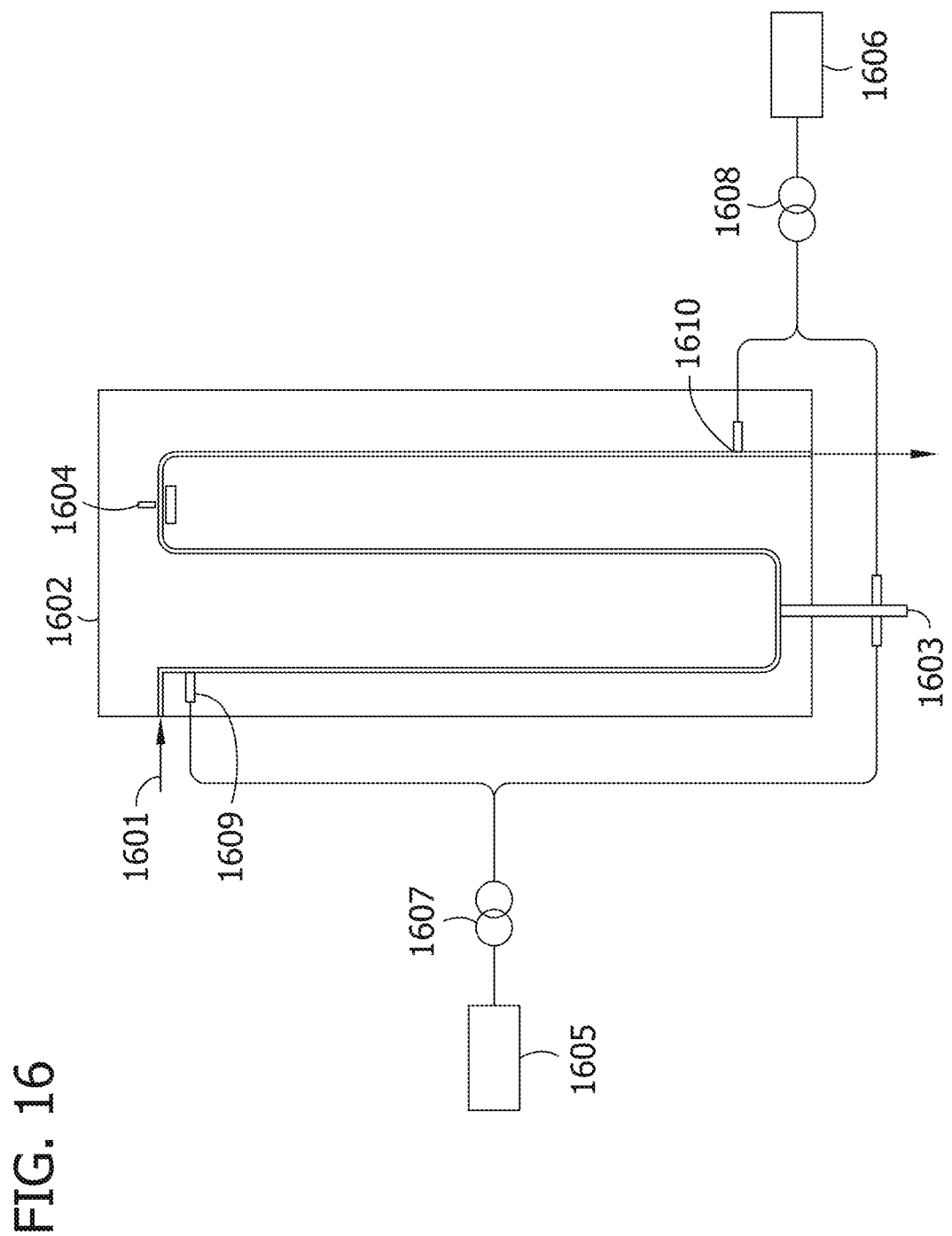
FIG. 16 provides a diagram of an alternative tube arrangement of another embodiment.

FIG. 16 shows a diagram of a reactor heating system of one embodiment, wherein the reactor tube comprises several bends. It is well known that piping may be oriented within an enclosure by using a pipe that bends from one side of the enclosure to the other, one or more times. For example, as in a shell and tube heat exchanger. FIG. 16 employs a similar design technique with the reactor tube.

In FIG. 16, reactor tube 1601 enters the outer shell 1602 of the reactor heating system, winds towards the bottom of the enclosure, back towards the top of the enclosure, and exits at the bottom of the enclosure.

At the bottom of the enclosure, the reactor tube is held in place via guide pin 1603. This guide pin is capable of moving to accommodate movements of the reactor tube caused by thermal expansion and contraction of the tube. The guide pin should be selected such that it has sufficient strength to hold the tube in place, but is able to withstand the heat and energy conditions of the direct electrical heating operation described herein. For example, the guide pin may comprise similar materials as the reactor tube.

At the top of the enclosure, a hanger is used to hold the reactor tube in place. The hanger should be of sufficient strength to hold the tube in place, but also be able to withstand the heat and energy conditions of the direct electrical heating operation described herein. In some embodiments, material used to electrically insulate and/or isolate the hanger from the reactor tube may be present. In certain embodiments, the insulating/isolating material may be selected from the group consisting of ceramics, nylon, polystyrene, polyvinylchloride (PVC), silicon, rubber, glass, and combinations thereof. In some embodiments, the insulating/isolating material may be selected from the group consisting of refractory materials, ceramics, and glass. In one embodiment, the insulating/isolating material may be a ceramic selected from the group consisting of ceramic fiber, a ceramic blanket, a ceramic board, or combinations thereof. In other embodiments, the insulating/isolating material may be selected from the group consisting of concrete (e.g., castable insulating concrete), a fiber brick, mineral wool, or combinations thereof.

The reactor heating system of FIG. 16 comprises two AC power supplies (1605 and 1606) and two transformers (1607 and 1608). The first AC power supply 1605 is connected to transformer 1607, and power is directed to connection point 1609 and the guide pin 1603. The second AC power supply 1606 is connected to transformer 1608, and power is directed to connection point 1610 and the guide pin 1603. In this way, two zones are created within the reactor tube. A first zone from connection point 1609 to the guide pin 1603, and a second zone from the guide pin 1603 to connection point 1610.

As explained above, it is one aspect of this embodiment that the guide pin is able to withstand the heat and energy conditions of the direct electrical heating operation. It is a further aspect of this embodiment that the guide pin comprise material such that electrical energy supplied to the guide pin will be directed to the reactor tube as shown in FIG. 16.

The use of the guide pin as one connection point for direct electrical heating of the reactor tube allows for a number of benefits to be realized. Any electrical connection point is subject to wear and tear and will require maintenance at certain intervals. By utilizing a connection point external to the heater enclosure, it is easier to access and service the electrical connection point. Further, the electrical connection point is not subjected to as extreme of conditions (i.e., heat) as connection points 1609 and 1610. Therefore, the materials of the connection point at the guide pin will not need to withstand the same temperatures as the materials connection points 1609 and 1610 will need to withstand.

FIG. 16 shows the power supplied through the shell of the reactor heating system to connection points 1609 and 1610, and a guide pin 1603 through the shell. In certain embodiments, one or more insulative gasket, electrical insulator, or insulating/isolating material may be placed between the power supplies or guide pin and the shell wall.

Although FIG. 16 shows one reactor tube in a winding configuration, it will be understood that a similar design may be employed for any of the methods or systems described herein, wherein the enclosure contains multiple reactor tubes or different reactor shapes.

Figure 17:
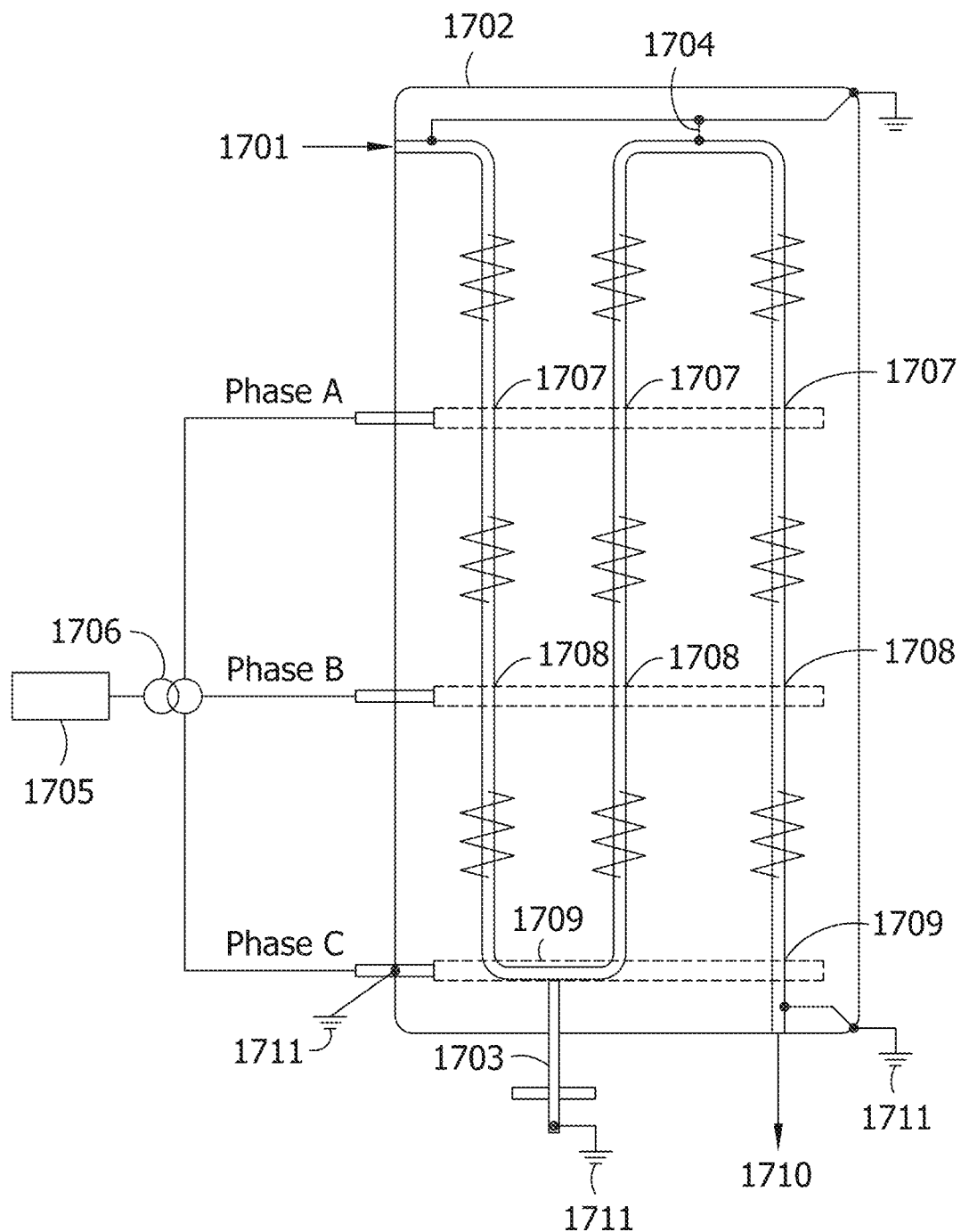
FIG. 17 provides an electrical diagram superimposed upon a reactor heating system, wherein the reactor tube comprises several bends.

FIG. 17 illustrates a diagram of a reactor heating system similar to FIG. 16, wherein the reactor tube comprises several bends. In FIG. 17, a single power source 1705 and transformer 1706 are used.

FIG. 17 shows an electrical diagram superimposed upon the reactor heating system. As described elsewhere herein, the reactor tube comprises an electrically conductive surface such that, when electrical energy is applied to the electrically conductive surface, the reactor tube is heated. The heating of the reactor tube subsequently heats any catalyst or reactor fluid disposed therein. The impedance of the tubes act as a resistive load for the circuit, as indicated by the resistors superimposed on the tube.

In FIG. 17, reactor tube enters the outer shell 1702 of the reactor heating system, winds towards the bottom of the enclosure, back towards the top of the enclosure, and exits at the bottom of the enclosure.

At the bottom of the enclosure, the reactor tube is held in place via guide pin 1703. This guide pin is capable of moving to accommodate movements of the reactor tube caused by thermal expansion and contraction of the tube. At the top of the enclosure, the reactor tube is held in place via a hanger 1704. The guide pin 1703 and hanger 1704 are as generally described above in FIG. 16.

The AC power supply 1705 is connected to transformer 1706, and three-phase power is directed to the connection points noted in FIG. 17. Phase A of the three-phase power is directed to connection points 1707, Phase B is directed to connection points 1708, and Phase C is directed to connection points 1709.

Grounding points 1711 are present in the reactor heating system. For example, the guide pin 1703 and hanger 1704 may be grounded as shown in FIG. 17.

In this configuration, an equivalent electrical impedance is achieved in each zone that is created within the reactor tube. For example, equivalent electrical impedance is observed in each zone between 1707 and 1708 and each zone between 1708 and 1709.

Although FIG. 17 shows a winding tube configuration, the power configuration shown in this figure can be applied to embodiments comprising a plurality of reactor tubes. For example, multiple vertical reactor tubes in parallel inside of the reactor shell 1702. A single source of three-phase power may then be directed to similarly located connection points for Phase A, similarly located connection points for Phase B, and similarly located connection points for Phase C on each of the parallel reactor tubes.

In various embodiments, the present disclosure is directed to heating systems and methods utilizing low voltage from the one or more power sources. For example, about 100 V or less, about 90 V or less, about 80 V or less, about 70 V or less, about 60 V or less, about 50 V or less, about 40 V or less, about 30 V or less, about 20 V or less, or about 10 V or less.

In other embodiments, the present disclosure is directed to heating systems and methods utilizing medium voltage. For example, from about 480V to about 1 kV. In other embodiments, the voltage may be from about 1 kV to about 35 kV, from about 1 kV to about 30 kV, from about 1 kV to about 29 kV, from about 1 kV to about 28 kV, from about 1 kV to about 27 kV, from about 1 kV to about 26 kV, from about 1 kV to about 25 kV, from about 1 kV to about 24 kV, from about 1 kV to about 23 kV, from about 1 kV to about 22 kV, from about 1 kV to about 21 kV, from about 1 kV to about 20 kV, from about 1 kV to about 19 kV, from about 1 kV to about 18 kV, from about 1 kV to about 17 kV, from about 1 kV to about 16 kV, from about 1 kV to about 15 kV, from about 1 kV to about 14 kV, from about 1 kV to about 13 kV, from about 1 kV to about 12 kV, from about 1 kV to about 11 kV, or from about 1 kV to about 10 kV.

Although certain configurations and embodiments are described herein, it will be understood that the heating systems and methods of the present disclosure should be designed in order to avoid an electrical arc. In certain configurations, the reactor tubes may be close enough that additional insulation or materials are required to avoid an electrical arc. Similarly, in certain configurations, the components of the reactor heating system may be close enough to the reactor shell that additional insulation or materials are required to avoid an electrical arc. The inclusion of such insulation or other materials are within the scope of the present invention.

Although certain configurations and embodiments are described herein, it will be understood that the heating systems and methods of the present disclosure may comprise either grounded or ungrounded systems.

In some embodiments, the present disclosure is directed to a system utilizing a hybrid heat input control. For example, a system utilizing both fuel fired heating and electrical heating (e.g., direct electrical heating).

One skilled in the art will understand that any of the methods or systems described herein are equally applicable to single and multi-phase (e.g., three phase) electrical current heating arrangements.

In one exemplary embodiment, the method of heating and reactor system of the present disclosure can be utilized in a steam methane reforming (SMR) process. While reference below is made to a catalytic SMR process, it will be understood that the methods and reactor system of the present disclosure is equally applicable to other catalytic reactions that comprises supplying heat to the reaction. For example, the methods and reactor systems of the present disclosure could also be applied to hydrotreating or hydrocracking operations. In one embodiment, the method of heating and reactor system of the present disclosure can be utilized in an ethylene reactor system. In another embodiment, the method of heating and reactor system of the present disclosure can be utilized in an ammonia cracking system.

A SMR process generally comprises introducing methane and steam into a catalytic reactor and heating to an elevated temperature to produce hydrogen and carbon monoxide. That is, the SMR process follows the reaction scheme set forth below.

$$CH_4 + H_2O \rightleftharpoons 3H_2 + CO$$

The catalyst of the SMR process may be a catalyst comprising nickel. For example, in one embodiment, the catalyst comprises nickel deposited on an alumina ceramic substrate such as $Al_2O_3$.

In one embodiment, the catalytic reactor of the SMR process comprises a plurality or more reactor tubes comprising electrically conductive metal(s) or alloy(s). For example, the one or more reactor tubes may comprise nickel, chromium, niobium, and combinations thereof. In this embodiment, one or more surface of each of the reactor tube(s) comprise sufficient electrically conductive metal or alloy such that at least one surface of each reactor tube is electrically conductive.

The one or more reactor tubes of the SMR process are heated by providing electrical energy to the at least one electrically conductive surface on each of the reactor tube(s). The temperature of each of the reactor tube(s) and the catalyst disposed therein is controlled by adjusting the current level of the electrical energy provided to the at least one electrically conductive surface of each reactor tube. Each of the reactor tube(s) are electrically isolated from the other electrically conductive components of the reactor system or galvanically isolated as described in further detail above.

The SMR process may comprise heating the one or more reactor tubes and the catalyst and reactor fluid disposed therein to a temperature of about 700° C. or greater, about 750° C. or greater, about 800° C. or greater, about 850° C. or greater, about 900° C. or greater, or about 1,000° C. or greater. In certain embodiments, the one or more reactor tubes and the catalyst are heated to a temperature of from about 700° C. to about 1,000° C., from about 750° C. to about 900° C., from about 800° C. to about 900° C., from about 825° C. to about 900° C., from about 850° C. to about 900° C., or from about 850° C. to about 875° C. For example, in one embodiment, the SMR process comprises heating the one or more reactor tubes and the catalyst and reactor fluid disposed therein to a temperature of about 870° C.

The SMR process may comprise maintaining a pressure of about 15 bar or greater, about 16 bar or greater, about 17 bar or greater, about 18 bar or greater, about 19 bar or greater, about 20 bar or greater, about 21 bar or greater, about 22 bar or greater, about 23 bar or greater, about 24 bar or greater, or about 25 bar or greater. For example, from about 15 bar to about 30 bar, from about 16 bar to about 30 bar, from about 17 bar to about 30 bar, from about 18 bar to about 30 bar, from about 19 bar to about 30 bar, from about 20 bar to about 30 bar, from about 20 bar to about 29 bar, from about 20 bar to about 28 bar, from about 20 bar to about 27 bar, from about 20 bar to about 26 bar, or from about 20 bar to about 25 bar.

Having described aspects of the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above system, processes, and reaction, without departing from the scope of the invention, it is intended that all matter contained in the above description and shown in the accompanying drawings shall be interpreted as illustrative and not in a limiting sense.

The invention claimed is:

1. A method of heating a system, wherein the system comprises:
   one or more tubes, wherein each of the one or more tubes has at least one electrically conductive surface; and
   wherein fluid enters each of the one or more tubes via an associated inflow pipe header and exits each of the one or more tubes via an associated outflow pipe header; and
   wherein the method comprises:
      providing three-phase power to at least one electrically conductive surface of each of the one or more tubes, wherein the first phase is provided to a first connection point, the second phase is provided to a second connection point, and the third phase is provided to a third connection point on the electrically conductive surface of each of the one or more tubes, and wherein the second connection point is between the first and third connection point;
      providing a top grounding point on each of the one or more tubes, wherein the top grounding point is between the first connection point and the inflow pipe header;
      providing a bottom grounding point on each of the one or more tubes, wherein the bottom grounding point is at the same location as the third connection point; and
      individually adjusting a current level of the electrical energy provided to the at least one electrically conductive surface of each tube of the one or more tubes to individually control the temperature of each tube.

2. The method of claim 1, wherein a first heating zone is formed between the top grounding point and first connection point; a second heating zone is formed between the first connection point and second connection point; and a third heating zone is formed between the second connection point and the third connection point.

3. The method of claim 2, wherein the electrical impedance of the first heating zone, second heating zone, and third heating zone is equal.

4. The method of claim 1, wherein the one or more tubes are galvanically isolated from the inflow pipe header and outflow pipe header.

5. The method of claim 1, wherein the three-phase power is provided by one or more AC power supplies connected to one or more transformers.

6. The method of claim 5, wherein each power supply is connected to a plurality of transformers and the plurality of transformers are in a parallel configuration.

7. The method of claim 1, wherein each of the one or more tubes has a catalyst disposed therein.

8. The method of claim 7, wherein the current level of the electrical energy provided to the at least one electrically conductive surface of each tube of the one or more tubes is individually adjusted to individually control the temperature of each tube and the catalyst disposed therein.

9. The method of claim 1, wherein the three-phase power is from about 480V to about 1 kV.

10. A method of heating a system, wherein the system comprises:
   one or more tubes, wherein each of the one or more tubes has at least one electrically conductive surface; and
   wherein fluid enters each of the one or more tubes via an associated inflow pipe header and exits each of the one or more tubes via an associated outflow pipe header; and
   wherein the method comprises:
      providing electrical energy from a split-phase, single phase transformer to a first connection point, a second connection point, and a third connection point on at least one electrically conductive surface of each of the one or more tubes, wherein the second connection point is a neutral/ground and located between the first and third connection points;

providing a top grounding point on each of the one or more tubes, wherein the top grounding point is between the first connection point and the inflow pipe header;

providing a bottom grounding point on each of the one or more tubes, wherein the bottom grounding point is between the third connection point and the outflow pipe header; and individually adjusting a current level of the electrical energy provided to the at least one electrically conductive surface of each tube of the one or more tubes to individually control the temperature of each tube.

11. The method of claim 10, wherein the method comprises providing electrical energy from a plurality of split-phase, single phase transformers; and wherein each of the split-phase, single phase transformers provide electrical energy to the first connection point, the second connection point, and the third connection point.

12. The method of claim 11, wherein each of the split-phase, single phase transformers provide electrical energy that is from about 480V to about 1 kV.

13. The method of claim 10, wherein the system comprises a plurality of tubes and wherein providing electrical energy comprises:

providing electrical energy from a power source to a three-phase transformer; and directing each of the phases from the three-phase transformer to separate split-phase, single-phase transformers to form a plurality of split-phase power sources;

wherein the plurality of split-phase power sources provide electrical energy to the electrically conductive surface of each tube of the plurality of tubes.

14. The method of claim 13, wherein the system comprises three tubes and wherein providing electrical energy comprises:

providing electrical energy from a power source to a three-phase transformer;

directing each of the three phases from the three-phase transformer to three separate split-phase, single-phase transformers to form a first split-phase power source, a second split-phase power source, and a third split-phase power source;

supplying the first split-phase power source to at least one electrically conductive surface on a first tube;

supplying the second split-phase power source to at least one electrically conductive surface on a second tube; and supplying the third split-phase power source to at least one electrically conductive surface on a third tube.

15. The method of claim 10, wherein a first heating zone is formed between the top grounding point and the first connection point, a second heating zone is formed between the first connection point and second connection point, a third heating zone is formed between the second connection point and third connection point, and a fourth heating zone is formed between the third connection point and the bottom grounding point.

16. The method of claim 15, wherein the electrical impedance of the first heating zone and second heating zone is equal to the electrical impedance of the third heating zone and fourth heating zone.

17. The method of claim 10, wherein the one or more tubes are galvanically isolated from the inflow pipe header and outflow pipe header.

18. The method of claim 10, wherein each of the one or more tubes has a catalyst disposed therein.

19. A method of heating a system, wherein the system comprises:

one or more tubes, wherein each of the one or more tubes has at least one electrically conductive surface; and wherein fluid enters each of the one or more tubes via an associated inflow pipe header and exits each of the one or more tubes via an associated outflow pipe header; and wherein the method comprises:

providing electrical energy to at least one electrically conductive surface of each of the one or more tubes; and individually adjusting a current level of the electrical energy provided to the at least one electrically conductive surface of each tube of the one or more tubes to individually control the temperature of each tube;

wherein, for each tube of the one or more tubes, providing electrical energy comprises:

providing a plurality of power supplies connected to a plurality of three-phase transformers;

directing the first power phase from each of the plurality of three-phase transformers to a first connection point and fourth connection point on the at least one electrically conductive surface;

directing the second power phase from each of the plurality of three-phase transformers to a second connection point on the at least one electrically conductive surface; and directing the third power phase from each of the plurality of three-phase transformers to a third connection point on the at least one electrically conductive surface.

20. The method of claim 19, wherein the second connection point and third connection point are located between the first connection point and fourth connection point.

21. The method of claim 20, wherein:

a first heating zone is formed between the first connection point and second connection point;

a second heating zone is formed between the second connection point and third connection point;

a third heating zone is formed between the third connection point and fourth connection point;

wherein the first, second, and third heating zones do not overlap; and wherein the electrical impedance of the tube in the first heating zone, second heating zone, and third heating zone are equal.

22. The method of claim 19, wherein the system further comprises a top grounding point connected to the inflow pipe header and/or a bottom grounding point connected to the outflow pipe header.

23. The method of claim 19, wherein each of the plurality of power supplies provide from about 480V to about 1 kV.

24. The method of claim 19, wherein each of the one or more tubes has a catalyst disposed therein.

25. A method of heating a system, wherein the system comprises:

one or more tubes, wherein each of the one or more tubes has at least one electrically conductive surface;

wherein each of the one or more tubes comprises at least two 180° bends;

wherein each of the one or more tubes are positioned within the system by a guide pin and/or hanger affixed to the 180° bends; and wherein fluid enters each of the one or more tubes via an associated inflow pipe header and exits each of the one or more tubes via an associated outflow pipe header;

wherein the method comprises:
> providing three-phase power to at least one electrically conductive surface of each of the one or more tubes, wherein:
> > the first power phase is directed to a first, second, and third connection point on the tube;
> > the second power phase is directed to a fourth, fifth, and sixth connection point on the tube;
> > the third power phase is directed to a seventh, eighth, and ninth connection point on the tube; and
> 
> individually adjusting a current level of the electrical energy provided to the at least one electrically conductive surface of each tube of the one or more tubes to individually control the temperature of each tube.

26. The method of claim 25, wherein for each of the one or more tubes, the tube comprises a first 180° bend and a second 180° bend, forming a first heating zone between the inflow pipe header and first bend, a second heating zone between the first bend and second bend, and a third heating zone between the second bend and outflow pipe header.

27. The method of claim 26, wherein the first, fourth, and seventh connection points are located within the first heating zone; the second, fifth, and eighth connection points are located within the second heating zone; and the third, sixth, and ninth connection points are located within the third heating zone.

* * * * *